United States Patent
Suzuki et al.

(10) Patent No.: US 10,966,127 B2
(45) Date of Patent: Mar. 30, 2021

(54) TERMINAL APPARATUS, BASE STATION APPARATUS, AND COMMUNICATION METHOD REDUCING HANDOVER DELAY

(71) Applicants: Sharp Kabushiki Kaisha, Sakai (JP); FG Innovation Company Limited, Tuen Mun (HK)

(72) Inventors: Shoichi Suzuki, Sakai (JP); Wataru Ouchi, Sakai (JP); Tomoki Yoshimura, Sakai (JP); Liqing Liu, Sakai (JP); Kimihiko Imamura, Sakai (JP)

(73) Assignees: SHARP KABUSHIKI KAISHA, Sakai (JP); FG INNOVATION COMPANY LIMITED, New Territories (JP)

( * ) Notice: Subject to any disclaimer, the term of this patent is extended or adjusted under 35 U.S.C. 154(b) by 0 days.

(21) Appl. No.: 16/461,009

(22) PCT Filed: Nov. 17, 2017

(86) PCT No.: PCT/JP2017/041477
§ 371 (c)(1),
(2) Date: May 15, 2019

(87) PCT Pub. No.: WO2018/092882
PCT Pub. Date: May 24, 2018

(65) Prior Publication Data
US 2019/0274077 A1 Sep. 5, 2019

(30) Foreign Application Priority Data
Nov. 18, 2016 (JP) .............................. JP2016-224886

(51) Int. Cl.
*H04W 36/00* (2009.01)
*H04W 72/04* (2009.01)
(Continued)

(52) U.S. Cl.
CPC ... *H04W 36/0072* (2013.01); *H04W 36/0077* (2013.01); *H04W 36/08* (2013.01); *H04W 72/04* (2013.01); *H04W 74/08* (2013.01)

(58) Field of Classification Search
CPC ......... H04W 36/0072; H04W 36/0077; H04W 36/08; H04W 72/04; H04W 72/0413;
(Continued)

(56) References Cited

U.S. PATENT DOCUMENTS

2015/0085839 A1* 3/2015 Bergstrom ............ H04L 5/0078
370/336

FOREIGN PATENT DOCUMENTS

WO 2015/127987 A1 9/2015

OTHER PUBLICATIONS

Official Communication issued in International Patent Application No. PCT/JP2017/041477, dated Jan. 23, 2018.
(Continued)

*Primary Examiner* — Ian N Moore
*Assistant Examiner* — Brian T Le
(74) *Attorney, Agent, or Firm* — Keating & Bennett, LLP

(57) ABSTRACT

A terminal apparatus configures transmission timing for a PUSCH in a target cell based on first information included in a handover command received. The terminal apparatus initiates a random access procedure in a primary cell, at least in a case that an SR is pending, a UL-SCH resource is not available for transmission in a current subframe, and a valid PUCCH resource for the SR is not available in any one of subframes. The terminal apparatus does not initiate the random access procedure in the primary cell, in the case that the SR is pending, the UL-SCH resource is not available for the transmission in the current subframe, and the valid
(Continued)

PUCCH resource for the SR is not available in any one of the subframes, and at least in a case that the first information is configured.

2 Claims, 12 Drawing Sheets

(51) Int. Cl.
*H04W 74/08* (2009.01)
*H04W 36/08* (2009.01)

(58) Field of Classification Search
CPC ............. H04W 74/08; H04W 74/0833; H04W 72/0406; H04W 72/042; H04W 74/0866; H04W 74/0891
See application file for complete search history.

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, pp. 1-507.
"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, pp. 1-86.
ZTE Corporation, "Email discussion report on open issues of mobility enhancement", 3GPP TSG-RAN2 Meeting #96, R2-168184, Nov. 14-18, 2016, 29 pages.
Huawei et al., "Discussion on PScell configuration/activation requirements", 3GPP TSG-RAN WG4 Meeting #72bis, R4-146018, Oct. 6-10, 2014, 4 pages.
CATT; "Issues on RACH-less handover"; 3GPP TSG RAN WG2 Meeting #95; R2-165181; Aug. 22-26, 2016; pp. 1-3.
ZTE Corporation; "Email discussion report on open issues of mobility enhancement"; 3GPP TSG-RAN2 Meeting #96; R2-168942; Nov. 14-18, 2016; pp. 1-13.

* cited by examiner (500) DCI format 0:

o (501) 'Resource block assignment and hopping resource allocation' FIELD o (502) 'Modulation and coding scheme and redundancy version' FIELD o (503) 'New data indicator' FIELD (510) HOC grant:

o (511) 'Resource block assignment and hopping resource allocation' FIELD o (512) 'Modulation and coding scheme and redundancy version' FIELD

FIG. 5

TERMINAL APPARATUS, BASE STATION APPARATUS, AND COMMUNICATION METHOD REDUCING HANDOVER DELAY

TECHNICAL FIELD

The present invention relates to a terminal apparatus, a base station apparatus, a communication method, and an integrated circuit.

This application claims priority based on JP 2016-224886 filed on Nov. 18, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP) (NPL 1, 2, 3, 4, and 5). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In order to reduce handover delay, (i) handover by a terminal apparatus from a source cell to a target cell without performing a random access procedure, and (ii) pre-assignment of an uplink grant for transmission of a handover command response (RRC Connection Reconfiguration Complete message) by a handover command have been considered (NPL 6).

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: "3GPP TR 36.881 v0.5.0 (2015-11)", R2-157181, 4 Dec. 2015.

SUMMARY OF INVENTION

Technical Problem

An aspect of the present invention provides a terminal apparatus capable of efficiently communicating with a base station apparatus, a base station apparatus communicating with the terminal apparatus, a communication method used for the terminal apparatus, a communication method used for the base station apparatus, an integrated circuit to be mounted on the terminal apparatus, and an integrated circuit to be mounted on the base station apparatus.

Solution to Problem (1) According to some aspects of the present invention, the following measures are provided. That is, a first aspect of the present invention is a terminal apparatus that includes a receiver configured to receive a handover command including a first information, a transmitter configured to configure transmission timing for a PUSCH in a target cell based on the first information, and transmit the PUSCH, and a medium access control layer processing unit configured to initiate a random access procedure in a primary cell, at least in a case that at least one SR is pending, a UL-SCH resource is not available for transmission in a current subframe, and a MAC entity does not have a valid PUCCH resource for the at least one SR in any one of subframes, wherein the medium access control layer processing unit does not initiate the random access procedure in the primary cell, in the case that the at least one SR is pending, the UL-SCH resource is not available for the transmission in the current subframe, and the MAC entity does not have the valid PUCCH resource for the at least one SR in any one of the subframes, and at least in a case that the first information is configured.

(2) A second aspect of the present invention is a communication method used for a terminal apparatus, the communication method including the steps of receiving a handover command including first information, configuring transmission timing for a PUSCH in a target cell based on the first information, and transmitting the PUSCH, initiating a random access procedure in a primary cell at least in a case that at least one SR is pending, a UL-SCH resource is not available for transmission in a current subframe, and a MAC entity does not have a valid PUCCH resource for the at least one SR in any one of subframes, and not initiating the random access procedure in the primary cell in the case that the at least one SR is pending, the UL-SCH resource is not available for the transmission in the current subframe, and the MAC entity does not have the valid PUCCH resource for the at least one SR in any one of the subframes, and at least in a case that the first information is configured.

Advantageous Effects of Invention

According to an aspect of the present invention, a terminal apparatus and a base station apparatus can efficiently communicate with each other.

BRIEF DESCRIPTION OF DRAWINGS

FIG. 5 is a diagram for describing fields included in an uplink grant according to the present embodiment.

DESCRIPTION OF EMBODIMENT

The embodiment of the present invention will be described below.

Figure 1:
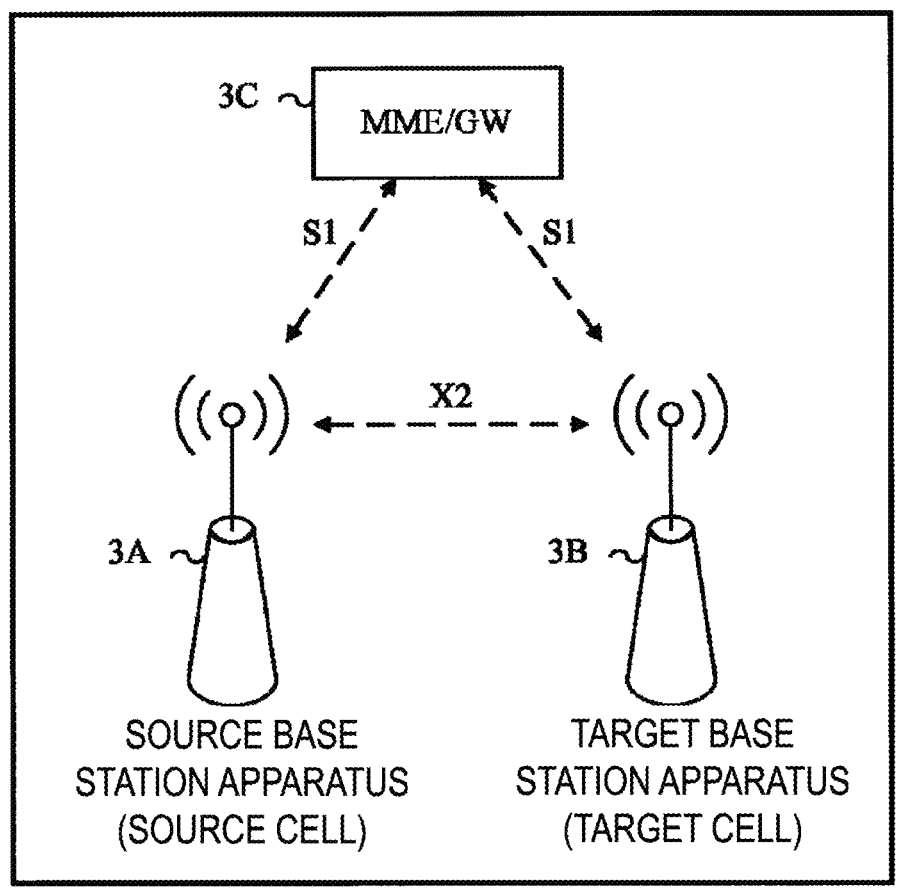
FIG. 1 is a conceptual diagram of a radio communication system according to the present embodiment.
Figure 1:
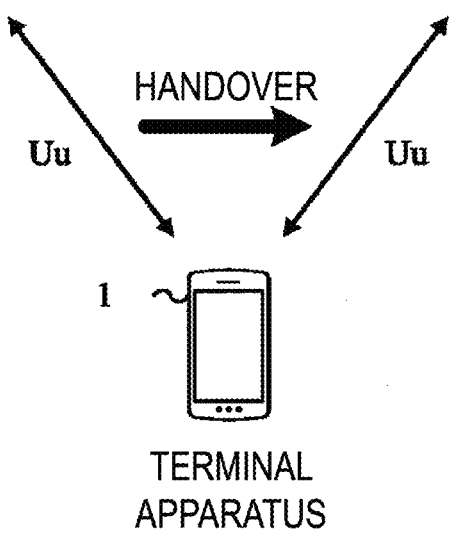

FIG. 1 is a conceptual diagram of a radio communication system according to the present embodiment. In FIG. 1, the radio communication system includes the terminal apparatus 1 and a base station apparatus 3. The base station apparatus 3 includes a source base station apparatus 3A, the target base station apparatus 3B, and a Mobility Management Entity (MME)/GateWay (GW). A Uu is a radio access link between the terminal apparatus 1 and the base station apparatus 3. The Uu includes an uplink from the terminal apparatus 1 to the base station apparatus 3, and a downlink from the base station apparatus 3 to the terminal apparatus 1. An X2 is a backhaul link between the source base station apparatus 3A and the target base station apparatus 3B. An S1 is a backhaul link between the source base station apparatus 3A/target base station apparatus 3B and the MME/GW.

The terminal apparatus 1 may hand over from the source base station apparatus 3A to the target base station apparatus 3B. The terminal apparatus 1 may hand over from a source cell to a target cell. A source cell may be managed by the source base station apparatus 3A. A target cell may be managed by the target base station apparatus 3B. The source base station apparatus 3A and the target base station apparatus 3B may be the same apparatus. In other words, the terminal apparatus 1 may hand over from a source cell managed by the source base station apparatus 3A to a target cell managed by the source base station apparatus 3A. A source cell is also referred to as a source primary cell. A target cell is also referred to as a target primary cell.

Hereinafter, carrier aggregation will be described.

According to the present embodiment, multiple serving cells are configured for the terminal apparatus 1. A technology by which the terminal apparatus 1 communicates via multiple serving cells is referred to as cell aggregation or carrier aggregation. In the carrier aggregation, multiple serving cells that are configured are also referred to as aggregated serving cells.

Time Division Duplex (TDD) and/or Frequency Division Duplex (FDD) is applied to the radio communication system in the present embodiment. For the cell aggregation, the TDD may be applied to all multiple serving cells. Alternatively, in a case of the cell aggregation, serving cells to which the TDD is applied and serving cells to which the FDD is applied may be aggregated. In the present embodiment, the serving cells to which the TDD is applied are also referred to as TDD serving cells.

Multiple serving cells that are configured include one primary cell and one or multiple secondary cells. The primary cell is a serving cell in which an initial connection establishment procedure has been performed, a serving cell in which a connection re-establishment procedure has been initiated, or a cell indicated as a primary cell during a handover procedure. The secondary cell may be configured at a point of time at which or after a Radio Resource Control (RRC) connection is established.

The primary cell includes a source primary cell and a target primary cell.

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier.

The terminal apparatus 1 can perform simultaneous transmission of multiple physical channels/multiple physical signals in aggregated multiple serving cells (component carriers). The terminal apparatus 1 can perform simultaneous reception of multiple physical channels/multiple physical signals in aggregated multiple serving cells (component carriers).

Figure 2:
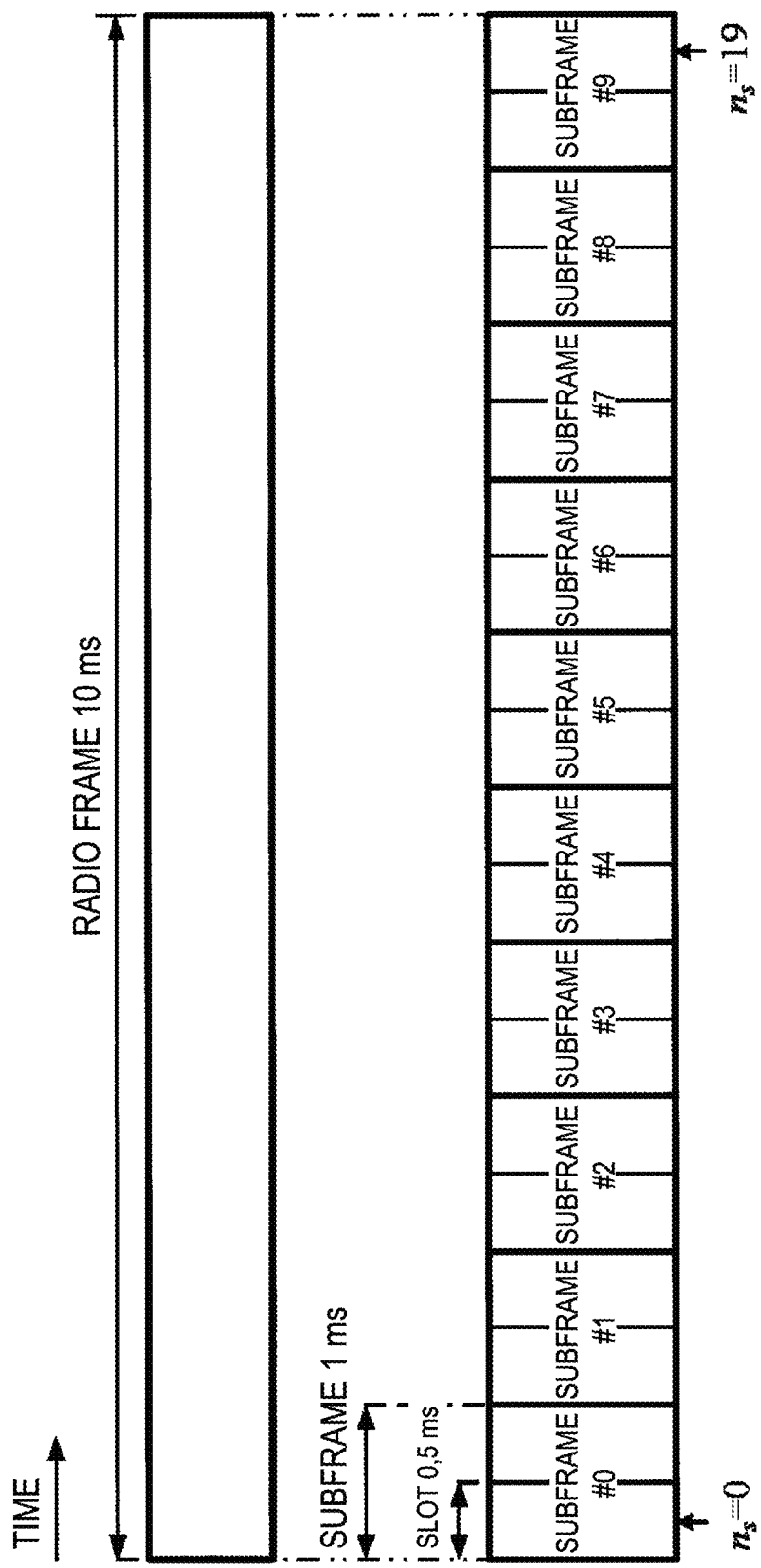
FIG. 2 is a diagram illustrating a schematic configuration of a radio frame according to the present embodiment.

FIG. 2 is a diagram illustrating a schematic configuration of a radio frame according to the present embodiment. In FIG. 2, a horizontal axis is a time axis.

Various field sizes in a time domain are expressed by the number of time unit $T_s=1/(15000*2048)$ seconds. A length of the radio frame is $T_f=307200*T_s=10$ ms. Each radio frame includes ten contiguous subframes in the time domain. A length of each subframe is $T_{subframe}=30720*T_s=1$ ms. Each subframe i includes two contiguous slots in the time domain. The two contiguous slots in the time domain are a slot having a slot number $n_s$ of 2i in the radio frame and a slot having a slot number $n_s$ of 2i+1 in the radio frame. A length of each slot is $T_{slot}=153600*n_s=0.5$ ms. Each radio frame includes ten contiguous subframes in the time domain. Each radio frame includes 20 contiguous slots ($n_s=0, 1, \ldots, 19$) in the time domain. A subframe is also referred to as a Transmission Time Interval (TTI).

Figure 3:
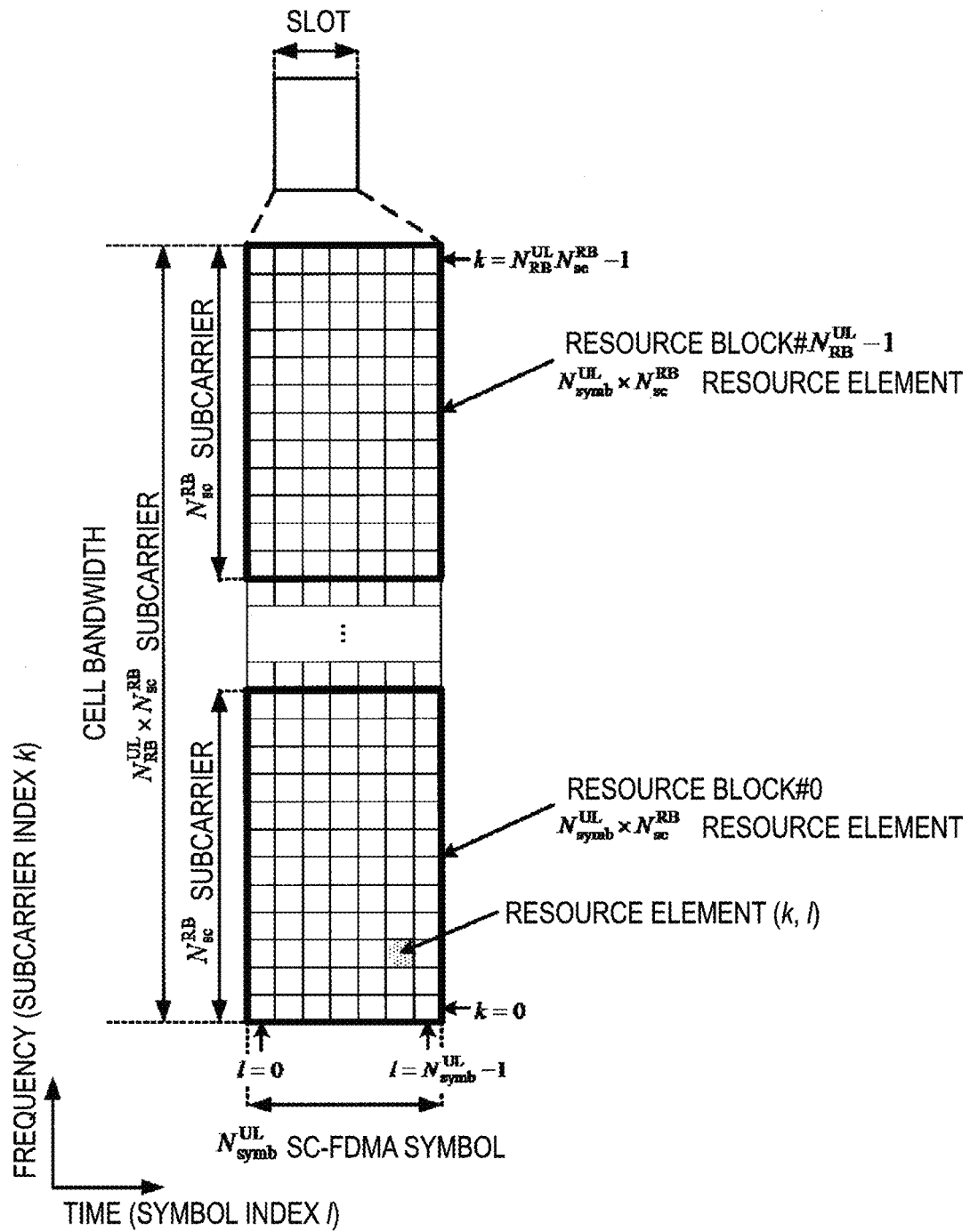
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, a horizontal axis is a time axis, and a vertical axis is a frequency axis. In FIG. 3, 1 is a Single Carrier-Frequency Division Multiple Access (SC-FDMA) symbol number/index, and k is a subcarrier number/index.

A physical signal or a physical channel transmitted in each of slots is expressed by a resource grid. In an uplink, the resource grid is defined by multiple subcarriers and multiple SC-FDMA symbols. Each element within the resource grid is referred to as a resource element. The resource element is expressed by a subcarrier number/index k and an SC-FDMA symbol number/index 1.

The resource grid is defined for each antenna port. In the present embodiment, description is given for one antenna port. The present embodiment may be applied to each of multiple antenna ports.

The uplink slot includes multiple SC-FDMA symbols 1 ($1=0, 1, \ldots, N^{UL}_{symb}$) in the time domain. $N^{UL}_{symb}$ indicates the number of SC-FDMA symbols included in one uplink slot. For a normal Cyclic Prefix (CP), $N^{UL}_{symb}$ is 7. For an extended Cyclic Prefix (CP), $N^{UL}_{symb}$ is 6.

The uplink slot includes multiple subcarriers k (k=0, 1, \ldots, $N^{UL}_{RB}*N^{RB}_{sc}$) in a frequency domain. $N^{UL}_{RB}$ is an uplink bandwidth configuration for a serving cell expressed by a multiple of $N^{RB}_{sc}$. $N^{RB}_{sc}$ is a (physical) resource block size in the frequency domain expressed by the number of subcarriers. In the present embodiment, a subcarrier interval $\Delta f$ is 15 kHz, and $N^{RB}_{sc}$ is 12 subcarriers. In other words, in the present embodiment, $N^{RB}_{sc}$ is 180 kHz.

A resource block is used to express mapping of a physical channel to a resource element. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block is constituted by ($N^{UL}_{symb} * N^{RB}_{sc}$) resource elements. One physical resource block corresponds to one slot in the time domain. Physical resource blocks are numbered (0, 1, . . . , $N^{UL}_{RB}-1$) in ascending order of frequencies in the frequency domain.

A downlink slot according to the present embodiment includes multiple OFDM symbols. Since a configuration of the downlink slot according to the present embodiment is the same as the configuration of the uplink slot, except that a resource grid is defined by multiple subcarriers and multiple OFDM symbols, description of the configuration of the downlink slot will be omitted.

Physical channels and physical signals in the present embodiment will be described.

In FIG. 1, in uplink radio communication from the terminal apparatus 1 to the base station apparatus 3, the following uplink physical channels are used. The uplink physical channels are used by a physical layer for transmission of information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). The uplink control information includes: downlink Channel State Information (CSI); a Scheduling Request (SR) used to request for the PUSCH (UpLink-Shared CHannel: UL-SCH) resource for initial transmission; and a Hybrid Automatic Repeat reQuest ACKnowledgement (HARQ-ACK) for downlink data (a Transport block, a Medium Access Control Protocol Data Unit (MAC PDU), a DownLink-Shared CHannel (DL-SCH), or a Physical Downlink Shared CHannel (PDSCH)). The HARQ-ACK indicates an ACKnowledgement (ACK) or a Negative-ACKnowledgement (NACK). The HARQ-ACK is also referred to as an HARQ feedback, HARQ information, HARQ control information, and an ACK/NACK.

The PUSCH is used for transmission of uplink data (UpLink-Shared CHannel (UL-SCH)). The PUSCH may be used to transmit the HARQ-ACK and/or channel state information along with the uplink data. Furthermore, the PUSCH may be used to transmit only the channel state information or to transmit only the HARQ-ACK and the channel state information. The PUSCH is used to transmit a random access message 3.

The PRACH is used to transmit a random access preamble (random access message 1). The PRACH is used for indicating the initial connection establishment procedure, the handover procedure, the connection re-establishment procedure, synchronization (timing adjustment) for uplink transmission, and a request for the PUSCH (UL-SCH) resource.

In FIG. 1, the following uplink physical signal is used in the uplink radio communication. The uplink physical signal is not used for transmitting information output from the higher layer, but is used by the physical layer.

UpLink Reference Signal (UL RS)

According to the present embodiment, the following two types of uplink reference signals are used.

DeModulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS to measure a channel state. The SRS is transmitted in a last SC-FDMA symbol in an uplink subframe, or an SC-FDMA symbol in an UpPTS.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used for broadcasting a Master Information Block (MIB, a Broadcast CHannel (BCH)) that is shared by the terminal apparatuses 1. The MIB is transmitted at intervals of 40 ms, and, within the interval, the MIB is repeatedly transmitted every 10 ms. Specifically, initial transmission of the MIB is performed in a subframe 0 in a radio frame that satisfies SFN mod 4=0, and retransmission (repetition) of the MIB is performed in subframes 0 in all the other radio frames. The System Frame Number (SFN) is a radio frame number. The MIB is system information. For example, the MIB includes information indicating the SFN.

The PCFICH is used for transmission of information indicating a region (OFDM symbols) to be used for transmission of the PDCCH.

The PHICH is used for transmission of an HARQ indicator for uplink data (UpLink-Shared CHannel (UL-SCH)) received by the base station apparatus 3. The HARQ indicator indicates the HARQ-ACK.

The PDCCH and the EPDCCH are used to transmit Downlink Control Information (DCI). The downlink control information is also referred to as a DCI format. The downlink control information includes a downlink grant and an uplink grant. The downlink grant is also referred to as downlink assignment or downlink allocation.

One downlink grant is used for scheduling one PDSCH within one serving cell. The downlink grant is used for the scheduling of the PDSCH within the same subframe as the subframe in which the downlink grant is transmitted.

One uplink grant is used for scheduling one PUSCH within one serving cell. The uplink grant is used for scheduling of the PUSCH within the fourth or later subframe from the subframe in which the uplink grant is transmitted.

The uplink grant transmitted on the PDCCH includes a DCI format 0. A transmission scheme for the PUSCH corresponding to the DCI format 0 is a single antenna port transmission scheme. The terminal apparatus 1 uses the single antenna port transmission scheme for transmission of the PUSCH corresponding to the DCI format 0. The PUSCH to which the single antenna port transmission scheme is applied is used for transmission of one codeword (one transport block).

The uplink grant transmitted on the PDCCH includes a DCI format 4. A transmission scheme for the PUSCH corresponding to the DCI format 4 is a closed-loop spatial multiplexing transmission scheme. The terminal apparatus 1 uses the closed-loop spatial multiplexing transmission scheme for transmission of the PUSCH corresponding to the DCI format 4. The PUSCH to which the closed-loop spatial multiplexing transmission scheme is applied is used for transmission of up to two codewords (up to two transport blocks).

CRC parity bits to be attached to the downlink grant or the uplink grant are scrambled with a Cell-Radio Network Temporary Identifier (C-RNTI), Temporary C-RNTI, or a Semi Persistent Scheduling Cell-Radio Network Temporary Identifier (SPS C-RNTI). The C-RNTI and the SPS C-RNTI are identifiers for identifying a terminal apparatus within a cell. The Temporary C-RNTI is used during a contention-based random access procedure. The uplink grant to which the CRC parity bits scrambled with the RNTI are attached is also referred to as an uplink grant for the RNTI or an uplink grant corresponding to the RNTI. The PDCCH including the uplink grant to which the CRC parity bits scrambled with the RNTI are attached is also referred to as the PDCCH for the RNTI, or the PDCCH corresponding to the RNTI.

The C-RNTI is used to control the PDSCH or the PUSCH in one subframe. The terminal apparatus 1 may transmit the PUSCH including a transport block, based on detection of the PDCCH including the uplink grant to which the CRC parity bits scrambled with the C-RNTI are attached. Retransmission of the transport block may be indicated by the PDCCH including the uplink grant to which the CRC parity bits scrambled with the C-RNTI are attached.

The SPS C-RNTI is used to periodically allocate a resource for the PDSCH or the PUSCH. The terminal apparatus 1 detects the PDCCH including the uplink grant to which CRC parity bits scrambled with SPS C-RNTI are attached, and, in a case that the uplink grant is determined to be valid as an SPS activation command, stores the uplink grant as a configured uplink grant. A MAC layer of the terminal apparatus 1 considers that the configured uplink grant periodically occurs. A subframe in which the configured uplink grant is considered to occur is given by a first period and a first offset. The terminal apparatus 1 receives information indicating the first period from the base station apparatus 3. Retransmission of a transport block transmitted on the periodically allocated PUSCH is indicated by the uplink grant to which the CRC parity bits scrambled with SPS C-RNTI are attached. The configured uplink grant is also referred to as an uplink grant configured by Medium Access Control (MAC), or a first configured uplink grant.

A random access response includes a Random Access Response grant (an RAR grant). The RAR grant is an uplink grant transmitted on the PDSCH. The terminal apparatus 1 may transmit the message 3 by using the PUSCH corresponding to the RAR grant. The terminal apparatus 1 uses the single antenna port transmission scheme for transmission of the PUSCH corresponding to the RAR grant, and retransmission of the PUSCH for the same transport block.

The Temporary C-RNTI is used to schedule retransmission of the random access message 3 and transmission of a random access message 4. Initial transmission of the random access message 3 is scheduled by the Random Access Response grant (RAR grant).

A handover command may include a HandOver Command grant (an HOC grant). The HOC grant is an uplink grant transmitted on the PDSCH. The terminal apparatus 1 stores the HOC grant as a configured uplink grant. The MAC layer of the terminal apparatus 1 considers that the configured uplink grant periodically occurs. A subframe in which the configured uplink grant is considered to occur is given by a second period and a second offset. The handover command includes information indicating the second period and the second offset. The handover command includes information indicating the first period. The terminal apparatus 1 may use the single antenna port transmission scheme for transmission of the PUSCH corresponding to the HOC grant, and retransmission of the PUSCH for the same transport block. Retransmission of the transport block transmitted on the periodically allocated PUSCH may be indicated by the uplink grant to which the CRC parity bits scrambled with C-RNTI are attached and/or the NACK. The configured uplink grant is also referred to as an uplink grant configured by Radio Resource Control (RRC) or a second configured uplink grant.

In other words, the SPS C-RNTI is used for retransmission of the transport block transmitted on the PUSCH corresponding to the uplink grant (the first configured uplink grant) that is considered to occur periodically based on the first period, and the C-RNTI is used for retransmission of the transport block transmitted on the PUSCH corresponding to the uplink grant (the second configured uplink grant) that is considered to occur periodically based on the second period. The first period and the second period are configured separately.

The PUSCH corresponding to the uplink grant (the first configured uplink grant) that is considered to occur periodically based on the first period and the first offset may be scrambled with a scramble sequence generated at least based on the SPS C-RNTI. The PUSCH corresponding to the uplink grant (the second configured uplink grant) that is considered to occur periodically based on the second period and the second offset may be scrambled with a scramble sequence generated at least based on the C-RNTI.

The PDSCH is used to transmit downlink data (DownLink Shared CHannel (DL-SCH)). The PDSCH is used to transmit a random access message 2 (random access response). The PDSCH is used for transmission of a handover command.

The PMCH is used to transmit multicast data (Multicast CHannel (MCH)).

In FIG. 1, the following downlink physical signals are used for the downlink radio communication. The downlink physical signals are not used for transmission of information output from the higher layer, but are used by the physical layer.

Synchronization Signal (SS)
DownLink Reference Signal (DL RS)

The synchronization signal is used by the terminal apparatus 1 to take synchronization in a frequency domain and a time domain in a downlink. The synchronization signal includes a Primary Synchronization Signal (PSS) and a Secondary Synchronization Signal (SSS).

The downlink reference signal is used by the terminal apparatus 1 to perform channel compensation on a downlink physical channel. The downlink reference signal is used by the terminal apparatus 1 to calculate channel state information of the downlink.

According to the present embodiment, the following seven types of downlink reference signals are used.

Cell-specific Reference Signal (CRS)
UE-specific Reference Signal (URS) relating to the PDSCH
DeModulation Reference Signal (DMRS) relating to the EPDCCH
Non-Zero Power Channel State Information-Reference Signal (NZP CSI-RS)

Zero Power Channel State Information-Reference Signal (ZP CSI-RS)

Multimedia Broadcast and multicast service over Single Frequency Network Reference Signal (MBSFN RS)

Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The base station apparatus 3 and the terminal apparatus 1 exchange (transmission and/or reception) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The PUSCH and the PDSCH are used to transmit the RRC signaling and the MAC CE. Here, the RRC signaling transmitted from the base station apparatus 3 on the PDSCH may be signalling common to multiple terminal apparatuses 1 in a cell. The RRC signaling transmitted from the base station apparatus 3 on the PDSCH may be signalling dedicated to a certain terminal apparatus 1 (also referred to as dedicated signaling or UE specific signaling). A cell-specific parameter may be transmitted by using the signalling common to the multiple terminal apparatuses 1 in the cell or the signalling dedicated to the certain terminal apparatus 1. A UE-specific parameter may be transmitted by using the signalling dedicated to the certain terminal apparatus 1.

Figure 4:
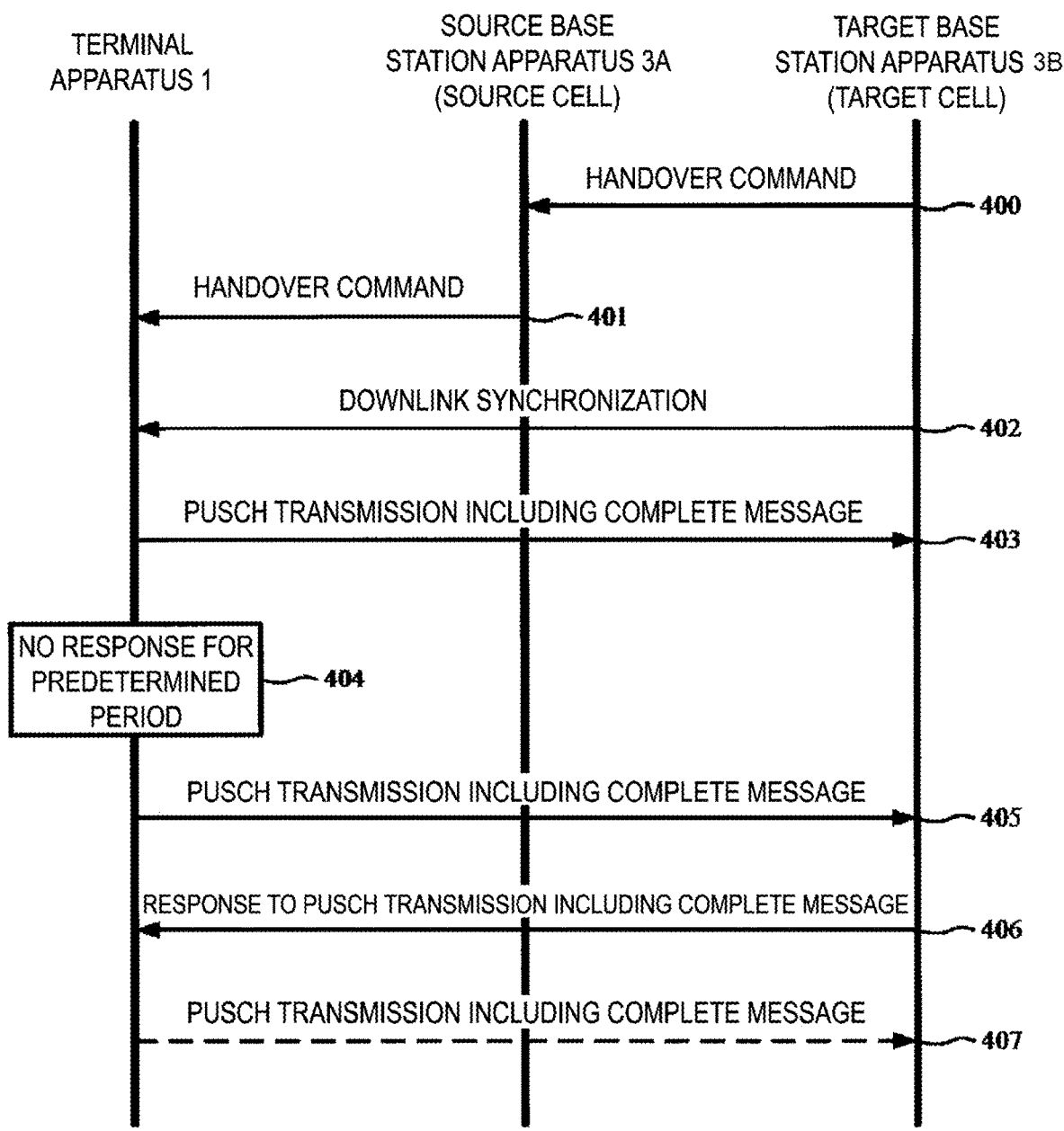
FIG. 4 is a diagram illustrating an example of a handover procedure according to the present embodiment.

FIG. 4 is a diagram illustrating an example of the handover procedure according to the present embodiment.

(Step 400) The target base station apparatus 3B transmits a handover command to the source base station apparatus 3A. The handover command is a parameter RRCConnectionReconfiguration including a parameter mobilityControlInfo. The parameter mobilityControlInfo may include information related to transmission timing in a target cell, the HOC grant, information for indicating the C-RNTI in the target cell, information for indicating the SPS C-RNTI in the target cell, information indicating the first period, information indicating the second period and the second offset, and information related to the target cell. The information related to the target cell may include information for indicating a Physical layer Cell Identity (PCI) of the target cell, and information for indicating a frequency of the target cell.

(Step 401) The source base station apparatus 3A transmits the handover command received from the target base station apparatus 3B to the terminal apparatus 1 by using the PDSCH.

(Step 402) The terminal apparatus 1 acquires downlink synchronization of the target cell based on the information related to the target cell. The terminal apparatus 1 may use part or all of a synchronization signal of the target cell, the CRS of the target cell, and the PBCH of the target cell, for the acquisition of the downlink synchronization.

(Step 403) The terminal apparatus 1 transmits uplink data on the first PUSCH in the target cell. In a case that the information related to the transmission timing in the target cell is configured, and the second configured uplink grant is present, the first PUSCH in the target cell may correspond to the second configured uplink grant. The uplink data may include a complete message (RRCConnectionReconfigurationComplete message). Here, transmission timing of transmission of the first PUSCH is configured based on the information related to the transmission timing in the target cell.

(Step 404) The terminal apparatus 1 attempts to receive/decode a response to the PUSCH (uplink data) corresponding to the HOC grant for a predetermined period of time in the target cell.

The response may include some or all of the following:
Response Type A: the PHICH for uplink data transmitted on the PUSCH corresponding to the second configured uplink grant (the ACK only, excluding the NACK)
Response Type B: the PDCCH/EPDCCH including the C-RNTI indicated by the handover command (Step 405) In a case that there is no response in the predetermined period of time in step 404, the terminal apparatus 1 transmits the uplink data on the PUSCH based on the second configured uplink grant. The uplink data may include a complete message (RRCConnectionReconfigurationComplete message).

(Step 406) The terminal apparatus 1 detects a response to the PUSCH transmission in step 405. The terminal apparatus 1 may terminate processing of the handover procedure based on detecting the response. The terminal apparatus 1 may consider that the handover has succeeded based on detecting the response.

(Step 407) In a case that the NACK is detected in step 406, the terminal apparatus 1 retransmits the uplink data on the PUSCH, based on the HOC grant. The retransmission based on the NACK is referred to as non-adaptive retransmission.

(Step 407) In a case that the terminal apparatus 1 detects the PDCCH/EPDCCH including an uplink grant indicating retransmission in step 406, the terminal apparatus 1 retransmits the uplink data on the PUSCH, based on the uplink grant. The retransmission based on the uplink grant is referred to as adaptive retransmission. CRC parity bits to be attached to the uplink grant are scrambled with the C-RNTI.

FIG. 5 is a diagram for describing fields included in the uplink grant according to the present embodiment.

A 'Resource block assignment and hopping resource allocation' field is used to indicate a physical resource block to which the PUSCH is allocated. The 'Resource block assignment and hopping resource allocation' field may be included in both the DCI format 0 and the HOC grant.

A 'Modulation and coding scheme and redundancy version' field is used to indicate a size of a transport block, a modulation scheme (modulation order $Q'_m$), and a redundancy version $rv_{idx}$. The 'Modulation and coding scheme and redundancy version' field may be included in both the DCI format 0 and the HOC grant.

A 'New data indicator' field is used to indicate initial transmission or retransmission of the PUSCH (transport block). The 'New data indicator' field may be included in the DCI format 0. The 'New data indicator' field is not included in the HOC grant.

Hereinafter, the HARQ for an uplink will be described.

The terminal apparatus 1 has one MAC entity. The MAC entity controls (manages) one or multiple HARQ entities. One independent HARQ entity exists for each serving cell (uplink component carrier), in an uplink for which the carrier aggregation is configured. The HARQ entity manages multiple HARQ processes in parallel. The HARQ Process is associated with an HARQ buffer. That is, the HARQ entity is associated with multiple HARQ buffers. The HARQ process stores MAC layer data in the HARQ buffer. The HARQ process indicates to a physical layer to transmit the MAC layer data.

In the uplink for which the carrier aggregation is configured, at least one transport block is generated for each subframe for each serving cell. Each transport block and HARQ retransmission of the transport block are mapped to one serving cell.

The MAC entity and the HARQ entity may identify an ID (identity) of the HARQ process to which the uplink grant corresponds, based on a subframe in which the PDCCH including the uplink grant is received. The MAC entity and the HARQ entity may identify an ID (identity) of the corresponding HARQ process, based on a subframe in which the first configured uplink grant or the second configured uplink grant is considered to occur. The HARQ entity passes the uplink grant to the identified HARQ process.

The HARQ entity, in a case that an NDI provided for a certain HARQ process is toggled as compared to a value of an NDI for previous transmission in the certain HARQ process, indicates to the HARQ process to trigger initial transmission. The HARQ entity, in a case that an NDI provided for a certain HARQ process is not toggled as compared to a value of an NDI for previous transmission in the certain HARQ process, indicates to the HARQ process to trigger adaptive retransmission. Note that, the HARQ process may determine whether the NDI is toggled or not. Here, the NDI for the previous transmission in the certain HARQ process corresponds to the uplink grant to which the CRC parity bits scrambled with the C-RNTI are attached. Here, in the case of determining whether the NDI is toggled as compared to the value of the NDI of the previous transmission, the terminal apparatus 1 ignores an NDI included in the uplink grant to which the CRC parity bits scrambled with the Temporary C-RNTI are attached.

In a case that the first configured uplink grant or the second configured uplink grant is passed to the HARQ process, the MAC entity and the HARQ entity consider that the NDI for the HARQ process is toggled. That is, in a case that the uplink grant that is considered to occur periodically is passed to the HARQ process, the MAC entity and HARQ entity consider that the NDI for the HARQ process is toggled.

In a case that the uplink grant is indicated for a certain HARQ process, the uplink grant corresponds to the C-RNTI, and a previous uplink grant that the HARQ entity passes for the certain HARQ process is the first configured uplink grant, the MAC entity and the HARQ entity consider that the NDI is toggled for the certain HARQ process regardless of a value of the NDI.

In a case that the uplink grant is indicated for a certain HARQ process, the uplink grant corresponds to the C-RNTI, and a previous uplink grant that the HARQ entity passes for the certain HARQ process is the second configured uplink grant, the MAC entity and the HARQ entity determine whether the NDI is toggled for the certain HARQ process or not, based on a value of the NDI. This enables adaptive retransmission of the transport block transmitted based on the second configured uplink grant.

In a case that the uplink grant is indicated for a certain HARQ process, and the uplink grant corresponds to the C-RNTI, the terminal apparatus 1 may determine whether a previous uplink grant that the HARQ entity passes for the certain HARQ process is an uplink grant configured by the MAC (uplink grant corresponding to the first period) or not. In a case that the previous uplink grant that the HARQ entity passes for the certain HARQ process is the uplink grant configured by the MAC (uplink grant corresponding to the first period), the terminal apparatus 1, the MAC entity and the HARQ entity may consider that the NDI is toggled for the certain HARQ process regardless of a value of the NDI.

In a case that a previous uplink grant that the HARQ entity passes for a certain HARQ process is determined not to be the uplink grant configured by the MAC (uplink grant corresponding to the first period), the terminal apparatus 1 may determine, based on a value of the received NDI, whether the NDI is toggled for the certain HARQ process or not. That is, in a case that the previous uplink grant that the HARQ entity passes for the certain HARQ process is an uplink grant configured by the RRC (uplink grant corresponding to the second period), the terminal apparatus 1 may determine, based on the value of the received NDI, whether the NDI is toggled for the certain HARQ process or not.

"The PDCCH including downlink control information including the toggled NDI (uplink grant, downlink grant)" is also referred to as "the PDCCH indicating initial transmission". "The PDCCH including downlink control information including the NDI that is not toggled (uplink grant, downlink grant)" is also referred to as "the PDCCH indicating adaptive retransmission".

The base station apparatus 3 may assume the above-described operation of the terminal apparatus in a case of performing scheduling of the PUSCH.

In step 403 in FIG. 4, in a case that the information related to the transmission timing in the target cell is not configured, the terminal apparatus 1 initiates a random access procedure in the target cell. In this case, first transmission of the PUSCH in the target cell corresponds to the RAR grant.

In step 403 in FIG. 4, in a case that the information related to the transmission timing in the target cell is configured, and that the second configured uplink grant is not present, the first PUSCH in the target cell may correspond to an uplink grant included in the PDCCH. A case that the second configured uplink grant is not present is the same as a case that the HOC grant is not included in the handover command. In step 403 in FIG. 4, in the case that the information related to the transmission timing in the target cell is configured, and that the second configured uplink grant is not present, the terminal apparatus 1 monitors the PDCCH in the target cell. Here, the PDCCH includes the PDCCH corresponding to the C-RNTI and the PDCCH corresponding to the SPS C-RNTI. Here, the terminal apparatus 1 may monitor the PDCCH until the terminal apparatus 1 detects the PDCCH corresponding to the first PUSCH, even in a case that the handover command includes a configuration related to DRX (discontinuousreception).

Now, the Discontinuous Reception (DRX) applicable to the present invention will be described.

A DRX functionality is configured by a higher layer (RRC) and processed through the MAC. The DRX functionality controls a PDCCH monitoring activity of the terminal apparatus 1 for the C-RNTI and the SPS C-RNTI of the terminal apparatus 1. The handover command may include information indicating a configuration of the DRX in the target cell.

In other words, the DRX functionality controls the monitoring activity of the terminal apparatus 1 for the PDCCH used to transmit a DCI format to which the CRC parity bits scrambled with the C-RNTI of the terminal apparatus 1 are attached. The DRX functionality need not be applied to the monitoring activity of the terminal apparatus 1 for the PDCCH used to transmit the DCI format to which the CRC parity bits scrambled with a predetermined RNTI are attached.

With the configured DRX, the terminal apparatus 1 may discontinuously monitor the PDCCHs through a DRX operation to be described below. In other cases, the terminal apparatus 1 may continuously monitor the PDCCHs.

The higher layer (RRC) controls the DRX operation by configuring the following multiple timers and a drxStartOffset value.

onDurationTimer
drx-InactivityTimer
drx-RetransmissionTimer (one for each of downlink HARQ processes except for a downlink HARQ process corresponding to a broadcast process)
drx-ULRetransmissionTimer (one for each of uplink HARQ processes)
longDRX-Cycle
HARQ Round Trip Time (RTT) timer (one for each downlink HARQ process)
UL HARQ RTT Timer (one for each uplink HARQ process)
drxShortCycleTimer
shortDRX-Cycle The base station apparatus 3 may transmit, to the terminal apparatus 1, an RRC message including parameters/information indicating respective values of onDurationTimer, drx-InactivityTimer, drx-RetransmissionTimer, drx-ULRetransmissionTimer, longDRX-Cycle, drxShortCycleTimer, shortDRX-Cycle, and drxStartOffset.

The terminal apparatus 1, based on the received RRC message, may set respective values of onDurationTimer, drx-InactivityTimer, drx-RetransmissionTimer, drx-ULRetransmissionTimer, longDRX-Cycle, drxShortCycleTimer, shortDRX-Cycle, and drxStartOffset.

longDRX-Cycle and shortDRX-Cycle are also collectively referred to as a DRX cycle.

onDurationTimer indicates the number of consecutive PDCCH subframes from the start of a DRX cycle.

drx-InactivityTimer indicates the number of consecutive PDCCH subframes subsequent to the subframe to which the PDCCH indicating initial transmission of uplink data or downlink data to the terminal apparatus 1 is mapped.

drx-RetransmissionTimer indicates the maximum number of consecutive PDCCH subframes for downlink retransmission expected by the terminal apparatus 1. The same value of drx-RetransmissionTimer is applied to all serving cells.

drx-ULRetransmissionTimer indicates the maximum number of consecutive PDCCH subframes until an uplink grant for uplink retransmission (uplink HARQ retransmission grant) is received. The same value of drx-ULRetransmissionTimer is applied to all serving cells in which an asynchronous HARQ is applied to an uplink.

The DRX cycle indicates an On Duration iteration cycle. An on duration period is followed by a period in which a PDCCH monitoring inactivity of the terminal apparatus 1 for the C-RNTI and the SPS C-RNTI of the terminal apparatus 1 is enabled.

Figure 6:
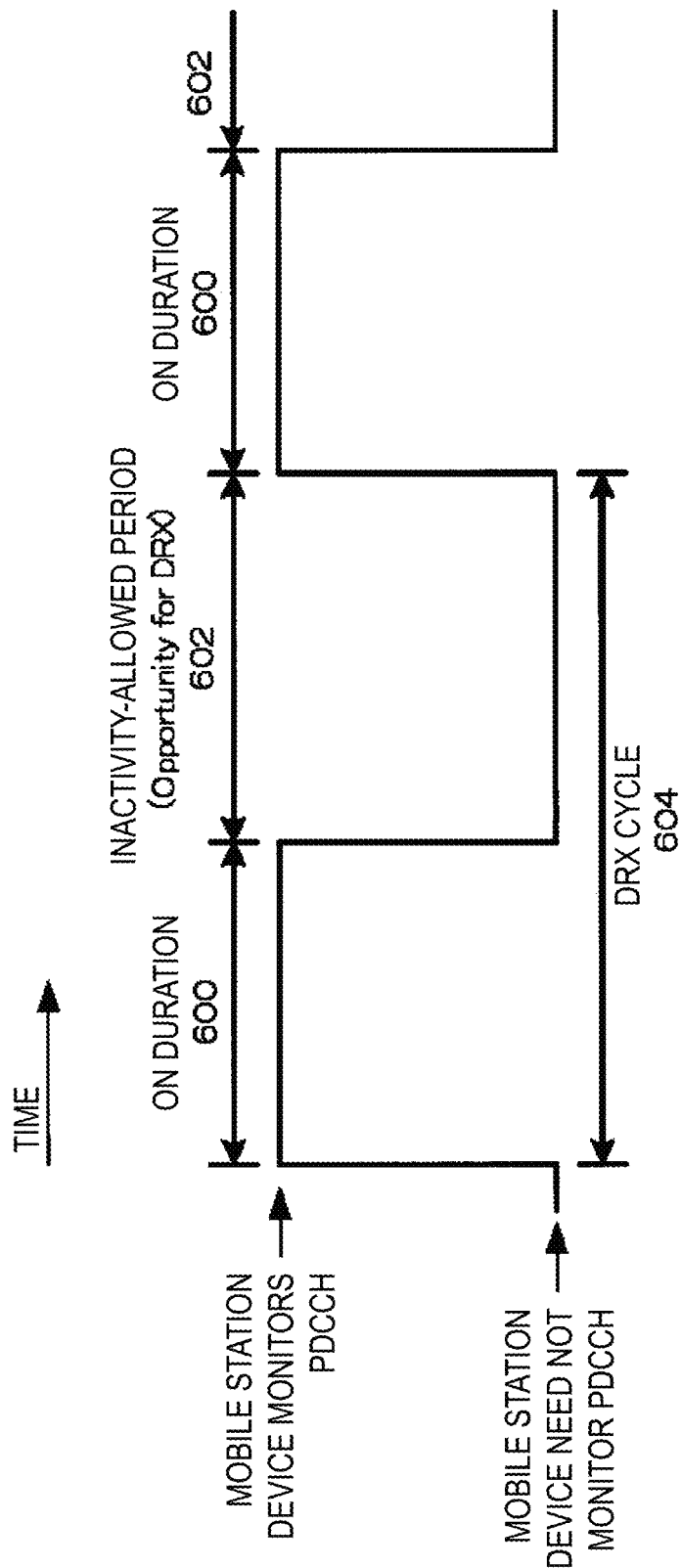
FIG. 6 is a diagram illustrating an example of a DRX cycle according to the present embodiment.

FIG. 6 is a diagram illustrating an example of the DRX cycle in the present embodiment. In FIG. 6, a horizontal axis is a time axis. In FIG. 6, the terminal apparatus 1 monitors the PDCCHs for an on duration period P600. In FIG. 6, a period P602 subsequent to the on duration period P600 is an inactivity-allowed period. In other words, in FIG. 6, the terminal apparatus 1 need not monitor the PDCCHs in the period P602.

drxShortCycleTimer indicates the number of consecutive subframes in which the terminal apparatus 1 follows a short DRX cycle.

drxStartOffset indicates a subframe in which the DRX cycle starts.

An HARQ RTT timer corresponding to a downlink HARQ process relates to start of drx-RetransmissionTimer and is managed for each downlink HARQ process. The HARQ RTT timer corresponding to the downlink HARQ process indicates a minimum interval from transmission of downlink data to retransmission of the downlink data. In other words, the HARQ RTT timer corresponding to the downlink HARQ process indicates a minimum amount of subframes previous to a subframe in which downlink HARQ retransmission is expected by the terminal apparatus 1.

Note that, in the present embodiment, one downlink HARQ process controls the HARQ of one piece of downlink data (a transport block). Alternatively, one downlink HARQ process may control two pieces of downlink data.

A UL HARQ RTT timer corresponding to an uplink HARQ process relates to start of drx-ULRetransmissionTimer and is managed for each uplink HARQ process. The UL HARQ RTT timer corresponding to the uplink HARQ process indicates a minimum interval from transmission of uplink data to transmission of an uplink grant (uplink HARQ retransmission grant) for retransmission of the uplink data. In other words, the UL HARQ RTT timer corresponding to the uplink HARQ process indicates a minimum amount of subframes previous to a subframe in which the uplink grant for uplink retransmission (uplink HARQ retransmission grant) is expected by the terminal apparatus 1.

The same active time may be applied to all serving cells. Different active times may be applied to serving cells belonging to a first cell group and serving cells belonging to a second cell group. Here, the same active time may be applied to all the serving cells belonging to the first cell group. Here, the same active time may be applied to all the serving cells belonging to the second cell group. In other words, the DRX may be individually controlled in each of the first cell group and the second cell group. That is, respective values of onDurationTimer, drx-InactivityTimer, drx-RetransmissionTimer, drx-ULRetransmissionTimer, longDRX-Cycle, drxShortCycleTimer, shortDRX-Cycle, and drxStartOffset may be set individually for each of the first cell group and the second cell group.

For example, in a case that the DRX cycle is configured, the Active Time may include a period satisfying at least one of a condition (a) to a condition (e) described below.

Condition (a): onDurationTimer, drx-InactivityTimer, drx-RetransmissionTimer, drx-ULRetransmissionTimer, or mac-ContentionResolutionTimer is running Condition (b): a scheduling request is transmitted on the PUCCH and is pending Condition (c): there is a possibility that an uplink grant for pending HARQ retransmission is transmitted for a synchronous HARQ, and a corresponding HARQ buffer holds data Condition (d): after successful reception of a random access response to a preamble that is not selected by the terminal apparatus 1, the PDCCH that is accompanied with the C-RNTI of the terminal apparatus 1 and that indicates initial transmission has not been received for a long time. Here, the preamble that is not selected by the terminal apparatus 1 includes a preamble indicated by information included in the handover command. Here, "the PDCCH indicating the initial transmission" in the above condition may be "the PDCCH indicating initial transmission in the downlink or the uplink".

Condition (e): in a case that information related to transmission timing in the target cell is configured and the second configured uplink grant is not configured, a first PDCCH accompanied with the RNTI of the terminal apparatus 1 and indicating initial transmission in the uplink has not been received for a long time. Here, the RNTI of the terminal apparatus 1 may be the C-RNTI. Here, the RNTI of the terminal apparatus 1 may be the C-RNTI or the SPS C-RNTI. Here, "the PDCCH indicating the initial transmission" in the above condition may be "the PDCCH indicating initial transmission in the uplink". Here, "the PDCCH indicating the initial transmission" in the above condition may be "the PDCCH indicating initial transmission in the downlink or the uplink". Here, "the PDCCH has not been received for a long time" may mean that the PDCCH has not been received in the target cell at all after resetting the MAC based on reception of the handover command.

Note that the conditions used to determine whether a certain period is included in active time or not are not limited to the condition (a) to the condition (e), one or more conditions different from the condition (a) to the condition (e) may be used, or some of the condition (a) to the condition (e) may be used.

Once a timer starts, the timer keeps running until the timer is stopped or the timer expires. In other cases, the timer is not running. In a case that the timer is not running, the timer may be started. In a case that the timer is running, the timer may be restarted. The timer is always to be started or restarted from an initial value of the timer.

The preamble serves as a message 1 in a random access procedure, and is transmitted on the PRACH. The preamble that is not selected by the terminal apparatus 1 is associated with a contention-based random access procedure.

The random access response serves as a message 2 in the random access procedure, and is transmitted on the PDSCH. The base station apparatus 3 transmits a random access response to the received preamble.

The terminal apparatus 1 performing the contention-based random access procedure receives the random access response, and then transmits a message 3. After transmitting the message 3, the terminal apparatus 1 monitors the PDCCH associated with a message 4.

mac-ContentionResolutionTimer indicates the number of consecutive subframes in which the terminal apparatus 1 monitors the PDCCH after the transmission of the message 3.

Figure 7:
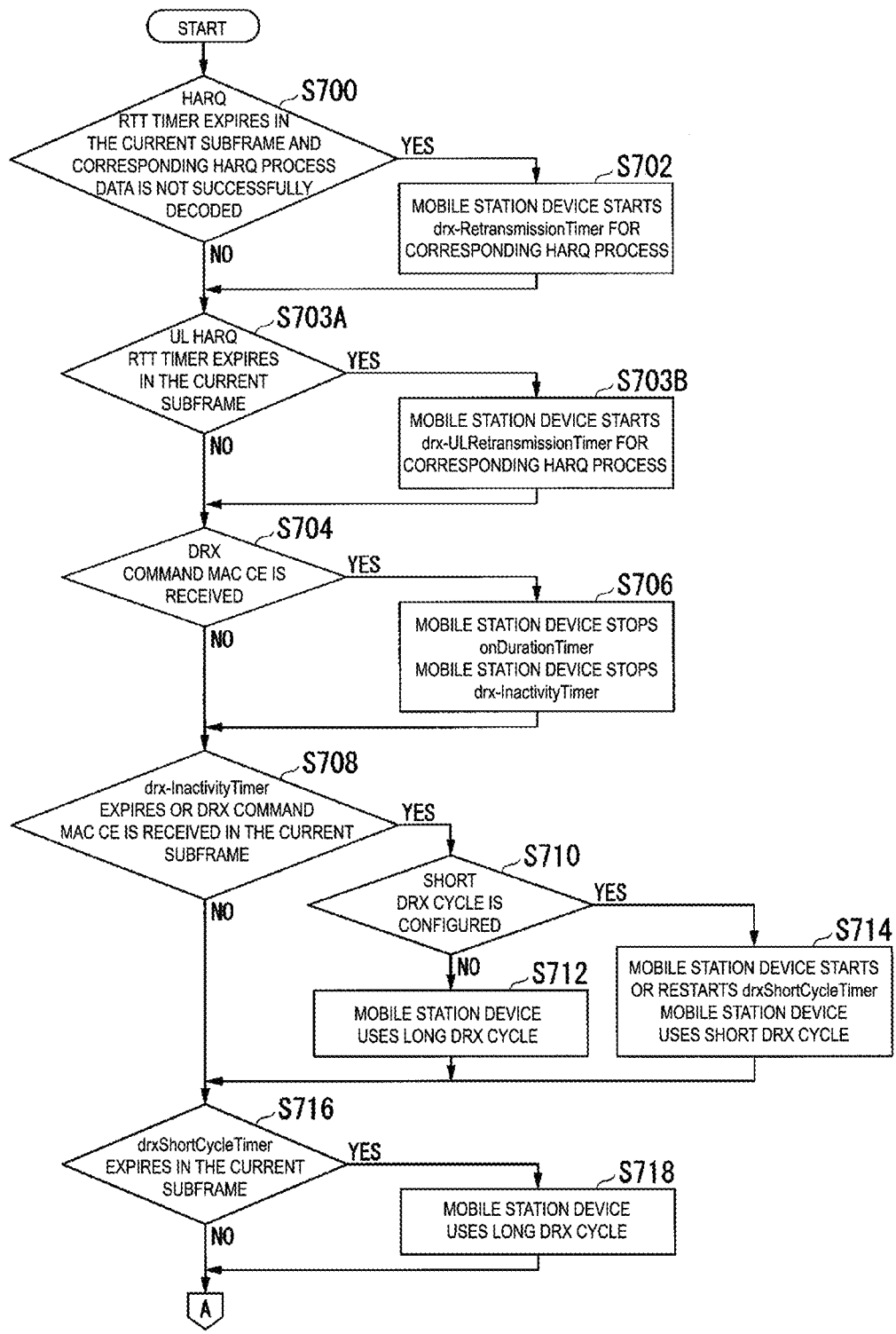
FIG. 7 is a flowchart illustrating an example of a DRX operation according to the present embodiment.
Figure 8:
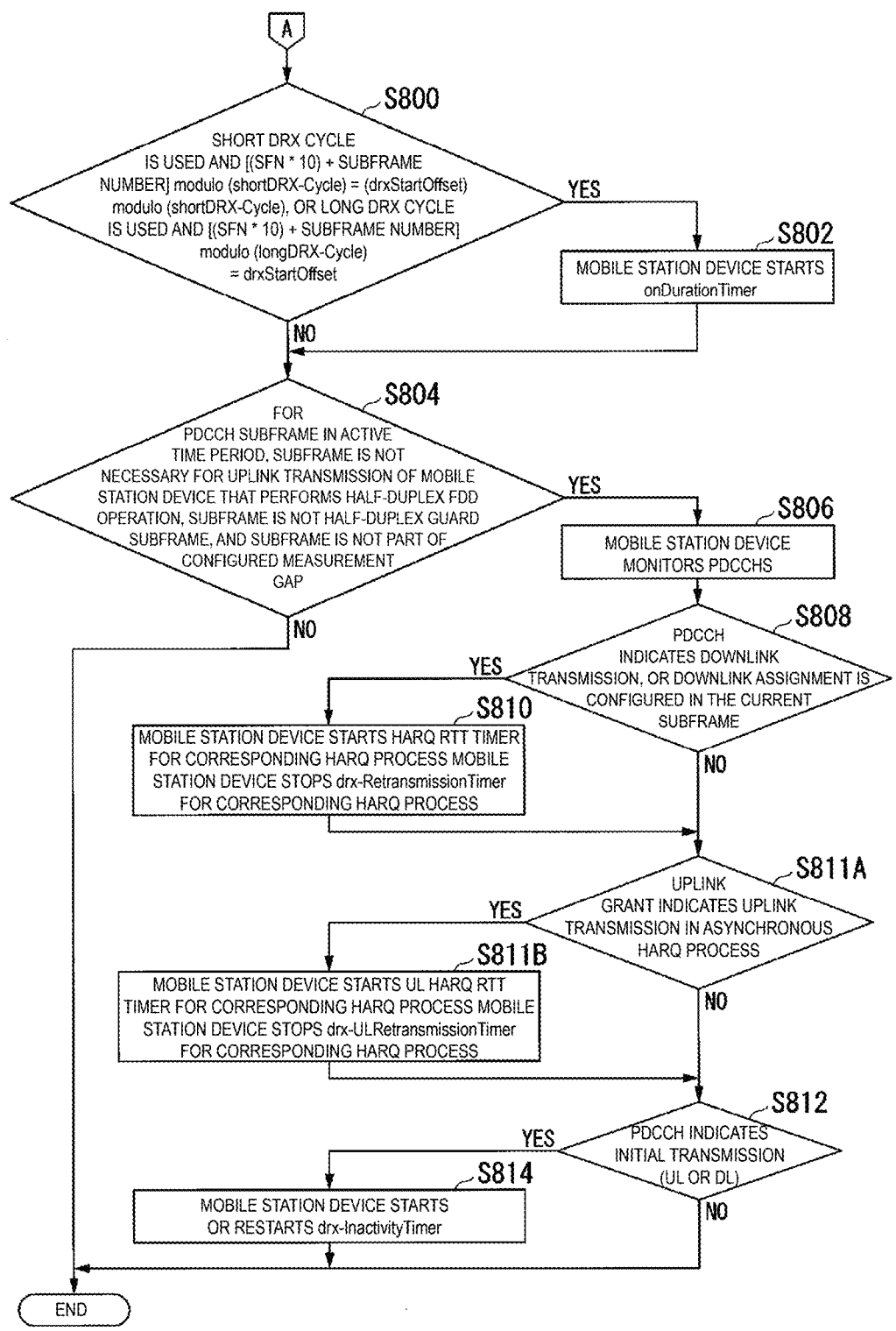
FIG. 8 is a flowchart illustrating the example of the DRX operation according to the present embodiment.

FIG. 7 and FIG. 8 are flowcharts illustrating an example of the DRX operation in the present embodiment. In a case that the DRX is configured, the terminal apparatus 1 performs the DRX operation for each of subframes according to the flowcharts in FIG. 7 and FIG. 8.

In a case that the HARQ RTT timer corresponding to a downlink HARQ process in the current subframe expires and data of the HARQ process corresponding to the HARQ RTT timer is not decoded successfully (S700: YES), the terminal apparatus 1 starts drx-RetransmissionTimer for the downlink HARQ process corresponding to the HARQ RTT timer (S702) and the processing proceeds to S703A. Otherwise (S700: NO), the processing of the terminal apparatus 1 proceeds to S703A.

In a case that the UL HARQ RTT timer corresponding to an uplink HARQ process in the current subframe expires (S703A: YES), the terminal apparatus 1 starts drx-ULRetransmissionTimer for the uplink HARQ process corresponding to the UL HARQ RTT timer (S703B), and the processing proceeds to S704. Otherwise (S703A: NO), the processing of the terminal apparatus 1 proceeds to S704.

In a case that a DRX command MAC CE is received (S704: YES), the terminal apparatus 1 stops onDurationTimer and drx-InactivityTimer (S706), and the processing proceeds to S708. Otherwise (S704: NO), the processing of the terminal apparatus 1 proceeds to S708.

In a case that drx-InactivityTimer expires or the DRX command MAC CE is received in the current subframe (S708: YES), the processing of the terminal apparatus 1 proceeds to S710. Otherwise (S708: NO), the processing of the terminal apparatus 1 proceeds to S716.

In a case that a short DRX cycle (shortDRX-Cycle) is not configured (S710: NO), the terminal apparatus 1 uses a long DRX cycle (S712), and the processing proceeds to S716. In a case that the short DRX-Cycle (shortDRX-Cycle) is configured (S710: YES), the terminal apparatus 1 starts or restarts drxShortCycleTimer to use the short DRX cycle (S714), and the processing proceeds to S716.

In a case that drxShortCycleTimer expires in the current subframe (S716: YES), the terminal apparatus 1 uses the long DRX cycle (S718), and the processing proceeds to S800 in FIG. 8. Otherwise (S716: NO), the processing of the terminal apparatus 1 proceeds to S800 in FIG. 8.

(1) In a case that the short DRX cycle is used and [(SFN*10)+subframe number] modulo (shortDRX-Cycle)= (drxStartOffset) modulo (shortDRX-Cycle) is satisfied, or (2) in a case that the long DRX cycle is used and [(SFN*10)+subframe number] modulo (longDRX-Cycle) =drxStartOffset is satisfied (S800: YES), the terminal apparatus 1 starts onDurationTimer (S802), and the processing proceeds to S804. Otherwise (S800: NO), the processing of the terminal apparatus 1 proceeds to S804.

In a case that all conditions (e) to (i) below are satisfied (S804: YES), the terminal apparatus 1 monitors the PDCCH in the current subframe (S806) and the processing proceeds to S808.

Condition (e): the current subframe is included in an active time period

Condition (f): the current subframe is a PDCCH subframe

Condition (g): the current subframe is not necessary for uplink transmission of the terminal apparatus 1 that performs a half-duplex FDD operation Condition (h): the subframe is not a half-duplex guard subframe Condition (i): the current subframe is not a part of a configured measurement gap For one FDD serving cell, all subframes may be PDCCH subframes. The terminal apparatus 1 and the base station apparatus 3 may identify a PDCCH subframe for a TDD serving cell, based on a UL-DL configuration. The terminal apparatus 1 that communicates with the base station apparatus 3 through one TDD serving cell, and the base station apparatus 3 may identify (select or determine), as a PDCCH subframe, a subframe indicated as a downlink subframe or a subframe including DwPTS in the UL-DL configuration corresponding to the serving cell.

The half-duplex FDD operation includes a type A half-duplex FDD operation and a type B half-duplex FDD operation. The terminal apparatus 1 may transmit information indicating whether to support the type A half-duplex FDD in an FDD band, to the base station apparatus 3. The terminal apparatus 1 may transmit information indicating whether to support the type B half-duplex FDD in an FDD band, to the base station apparatus 3.

In the type A half-duplex FDD operation, the terminal apparatus 1 is not capable of performing uplink transmission and downlink reception simultaneously.

In the type B half-duplex FDD operation, each of a subframe immediately before the subframe in which the terminal apparatus 1 performs uplink transmission and a subframe immediately after the subframe in which the mobile station device 1 performs uplink transmission is a half-duplex guard subframe.

In the type B half-duplex FDD operation, the terminal apparatus 1 is not capable of performing uplink transmission and downlink reception simultaneously. In the type B half-duplex FDD operation, the terminal apparatus 1 is not capable of performing downlink reception in a subframe immediately before the subframe in which the terminal apparatus 1 performs uplink transmission. In the type B half-duplex FDD operation, the terminal apparatus 1 is not capable of performing downlink reception in a subframe immediately after the subframe in which the terminal apparatus 1 performs uplink transmission.

The measurement gap is a time interval for the terminal apparatus 1 to perform measurements of cells operating on different frequencies and/or operating in different Radio Access Technologies (RATs). The base station apparatus 3 transmits information indicating the period of the measurement gap to the terminal apparatus 1. The terminal apparatus 1 configures the period of the measurement gap, based on the information.

In a case that at least one of the conditions (e) to (i) is not satisfied (S804: NO), the terminal apparatus 1 terminates the DRX operation for the current subframe. In other words, in the case that at least one of the conditions (e) to (i) is not satisfied, the terminal apparatus 1 need not monitor the PDCCH in the current subframe.

Note that the conditions used in S804 are not limited to the condition (e) to the condition (i). In S804, conditions different from the condition (e) to the condition (i) or some of the condition (e) to the condition (i) may be used.

In a case that the downlink assignment received via the PDCCH indicates downlink transmission or in a case that a downlink assignment is configured in the current subframe (S808: YES), the terminal apparatus 1 starts the HARQ RTT timer for the corresponding downlink HARQ process and stops drx-RetransmissionTimer for the corresponding downlink HARQ process (S810), and the processing proceeds to step 811A. Otherwise (S808: NO), the processing of the terminal apparatus 1 proceeds to S811A. Here, a length of the HARQ RTT timer may be eight.

A state in which the downlink assignment is configured denotes a state in which semi-persistent scheduling is activated by the downlink assignment along with the SPS C-RNTI.

In a case that an uplink grant received via the PDCCH indicates uplink transmission in an asynchronous HARQ process (S811A: YES), the terminal apparatus 1 (i) starts the UL HARQ RTT timer for an uplink HARQ process corresponding to the uplink grant in a subframe including PUSCH transmission corresponding to the uplink grant, and (ii) stops drx-ULRetransmissionTimer for the uplink HARQ process corresponding to the uplink grant (S811B), and (iii) the processing proceeds to step S812. Otherwise (S811A: NO), the processing of the terminal apparatus 1 proceeds to S812. Here, a length of the UL HARQ RTT timer may be four.

In a case that the downlink assignment or the uplink grant received via the PDCCH indicates initial transmission in the downlink or the uplink (S812: YES), the terminal apparatus 1 starts or restarts drx-InactivityTimer (S814), and terminates the DRX operation for the current subframe. Otherwise (S812: NO), the terminal apparatus 1 terminates the DRX operation for the current subframe.

Figure 9:
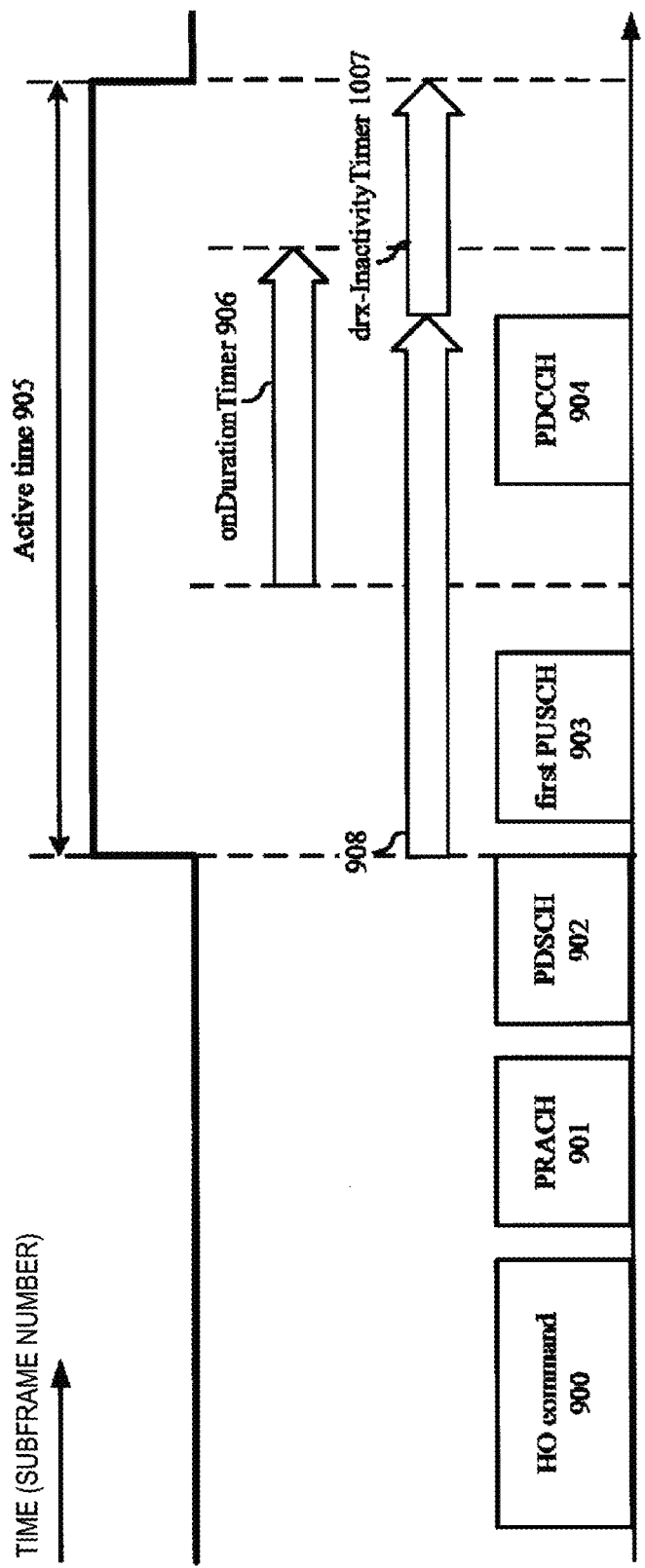
FIG. 9 is a diagram illustrating a first example of active time according to the present embodiment.

FIG. 9 is a diagram illustrating a first example of the active time according to the present embodiment. The terminal apparatus 1 receives a handover command 900 in a source cell. The handover command 900 does not include information relating to transmission timing in a target cell, and includes information indicating a preamble. The RRC of the terminal apparatus 1 provides a complete message (RRCConnectionReconfigurationComplete message) for transmission to the MAC. The MAC triggers a Buffer Status Report (BSR) based on generation of data for transmission (the complete message). The MAC triggers a Scheduling Request (SR) based on the trigger of the BSR. In a case that the SR is triggered, the SR is considered to be pending until the SR is canceled.

In a case that, at least one SR is pending, a UL-SCH resource available for transmission in the current subframe does not exist, and a MAC entity does not have a valid PUCCH resource for the SR in any subframe, the MAC entity initiates a random access procedure in a primary cell. Here, the UL-SCH resource may include a PUSCH resource allocated by an uplink grant. In FIG. 9, the handover command 900 may include a configuration of the PUCCH for the SR, but the configuration for the PUCCH for the SR is configured after the random access procedure is completed. In other words, in FIG. 9, the MAC entity initiates the random access procedure in a target primary cell, because the SR triggered due to the complete message is pending, and the MAC entity does not have a valid PUCCH resource for the SR in any subframe.

The terminal apparatus 1 transmits the PRACH including a preamble in the target cell. Here, the preamble is selected based on information indicating the preamble included in the handover command. In other words, the random access procedure in FIG. 9 is a non-contention based random access procedure. The terminal apparatus 1 receives a PDSCH 902 including a random access response corresponding to the preamble that the terminal apparatus 1 has transmitted. The terminal apparatus 1 considers that the random access procedure is successfully completed based on the reception of the random access response.

The terminal apparatus 1 may transmit a complete message by using a PUSCH 903 corresponding to the RAR grant included in the random access response. Further, active time 905 may include a period 908 in which a PDCCH 904 indicating initial transmission (in the uplink or downlink) corresponding to the C-RNTI after the successful reception of the random access response 902 is not received.

Figure 10:
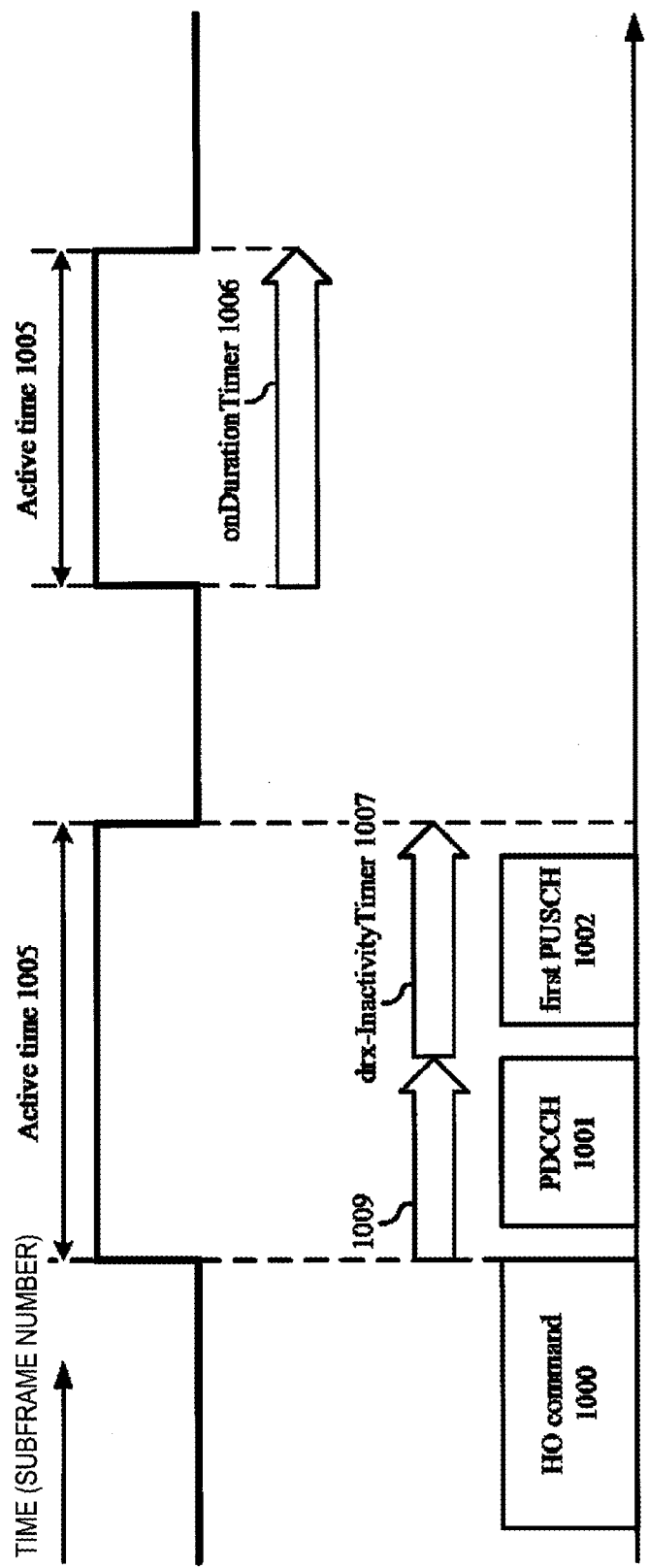
FIG. 10 is a diagram illustrating a second example of the active time according to the present embodiment.

FIG. 10 is a diagram illustrating a second example of the active time according to the present embodiment. The terminal apparatus 1 receives a handover command 1000 in a source cell. The handover command 1000 includes information related to transmission timing in a target cell, and does not include the HOC grant. The RRC of the terminal apparatus 1 indicates transmission of a complete message (RRCConnectionReconfigurationComplete message) to the MAC. The MAC triggers the Buffer Status Report (BSR), based on generation of data that can be transmitted (the complete message). The MAC triggers a Scheduling Request (SR) based on the trigger of the BSR. In a case that the SR is triggered, the SR is considered to be pending until the SR is canceled.

A UL-SCH resource may include a PUSCH resource allocated by an uplink grant. In FIG. 10, the handover command 1000 may include a configuration of the PUCCH for the SR, but the configuration of the PUCCH for the SR is configured after a random access procedure is completed. In other words, in FIG. 10, in a MAC entity, the SR triggered due to the complete message is pending, and the MAC entity does not have a valid PUCCH resource for the SR in any subframe.

In a case that the information related to the transmission timing in the target cell is configured, the MAC entity need not initiate a random access procedure in a primary cell, until the MAC entity transmits a first PUSCH 1002 in the target cell. For example, assuming that at least one SR is pending, a UL-SCH resource available for transmission in the current subframe does not exist, and the MAC entity does not have a valid PUCCH resource for the SR in any subframe, and in the case that the information related to the transmission timing in the target cell is configured, the MAC entity does not initiate the random access procedure in the primary cell, until the MAC entity transmits the first PUSCH 1002.

In the case that the information related to the transmission timing in the target cell is configured, the MAC entity need not initiate the random access procedure in the primary cell, until the MAC entity receives a response to the first PUSCH 1002 in the target cell. For example, assuming that at least one SR is pending, a UL-SCH resource available for transmission in the current subframe does not exist, and the MAC entity does not have a valid PUCCH resource for the SR in any subframe, and in the case that the information related to the transmission timing in the target cell is configured, the MAC entity does not initiate the random access procedure in the primary cell, until the MAC entity receives the response to the transmission of the first PUSCH 1002.

In the case that the information relating to the transmission timing in the target cell is configured, the MAC entity need not trigger the SR until the MAC entity transmits the first PUSCH 1002. Alternatively, in the case that information related to the transmission timing in the target cell is configured, the MAC entity need not trigger the SR, until the MAC entity receives the response to the transmission of the first PUSCH 1002.

The terminal apparatus 1 monitors the PDCCH during active time 1005 in the target cell. Here, the PDCCH includes the PDCCH for the C-RNTI, and the PDCCH for the SPS C-RNTI. Here, the active time 1005 may include a period 1009 in which a PDCCH 1001 indicating initial transmission has not been received at all in the target cell. Here, "the PDCCH indicating the initial transmission" may be "the PDCCH indicating initial transmission in the uplink". Here, "the PDCCH indicating the initial transmission" may be "the PDCCH indicating initial transmission in the downlink or the uplink". The period 1009 may start at the time at which the handover command is received. The period 1009 may start at the time at which a configuration based on the handover command is performed. The period 1009 may start at the time at which downlink synchronization of the target cell is acquired. The period 1009 may start at the time at which preparation of PDCCH monitoring in the target cell is completed.

The terminal apparatus 1 may transmit a complete message by using the PUSCH 1002 corresponding to the PDCCH 1001. Here, transmission timing of the transmission of the PUSCH 1002 is configured based on "the information related to the transmission timing in the target cell".

Even in the case that the information related to the transmission timing in the target cell is configured, the MAC entity may initiate the random access procedure in the primary cell, in a case that the MAC entity has already transmitted the first PUSCH in the target cell.

Even in the case that the information related to the transmission timing in the target cell is configured, the MAC entity may initiate the random access procedure in the primary cell, in a case that the MAC entity has already received the response to the first PUSCH in the target cell.

The base station apparatus 3 may transmit the PDCCH indicating initial transmission in the target cell, after a predetermined time from transferring the handover command to the source cell.

In a case that an uplink grant is included in the handover command, the active time 1005 need not include the period 1009 in which the PDCCH 1001 indicating the initial transmission has not been received at all in the target cell.

Even in a case that no uplink grant is included in the handover command, the active time 1005 need not include the period 1009 in which the PDCCH 1001 indicating the initial transmission has not been received at all in the target cell. Here, even in a case that the terminal apparatus 1 is not in the active time, the terminal apparatus 1 may monitor the PDCCH 1001 in the period 1009.

Further, in the case that the handover command includes the uplink grant, the active time 1005 may include a period in which a predetermined timer is running. The predetermined timer may start based on reception of the handover command. The predetermined timer may start based on a fact that a configuration based on the handover command is performed. The predetermined timer may start based on acquisition of downlink synchronization of the target cell. The predetermined timer may start based on completion of preparation for the PDCCH monitoring in the target cell. The predetermined timer may stop based on reception of the PDCCH 1001 indicating the initial transmission. The handover command may include information indicating a length of the timer.

The base station apparatus 3 may assume the above-described operation of the terminal apparatus in a case of performing scheduling of the PUSCH. For example, the base station apparatus 3 may determine transmission timing of the PDCCH 1001 by assuming the above-described operation of the terminal apparatus.

Accordingly, the terminal apparatus 1 is capable of efficiently performing uplink transmission.

Configurations of apparatuses according to the present embodiment will be described below.

Figure 11:
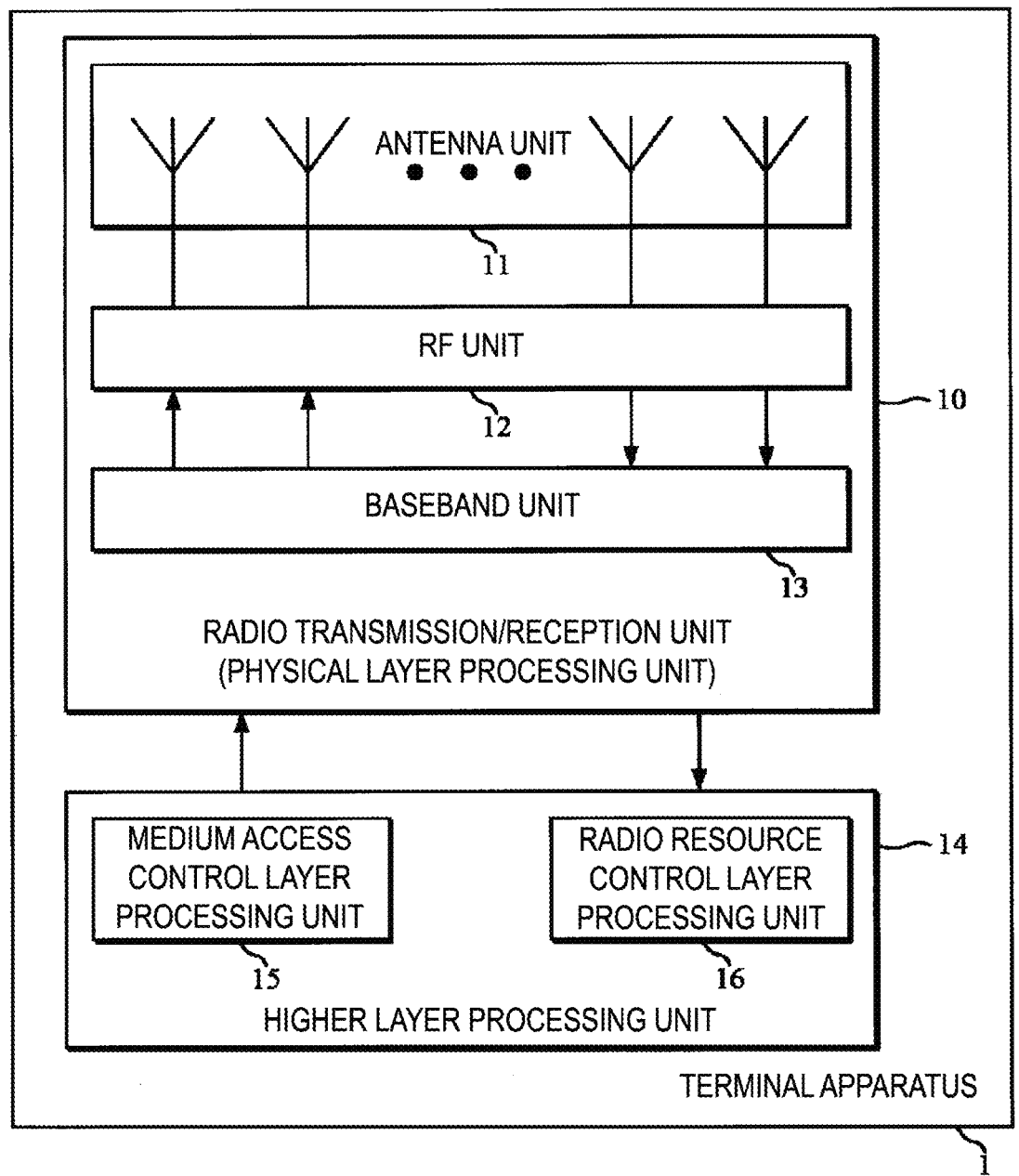
FIG. 11 is a schematic block diagram illustrating a configuration of a terminal apparatus 1 according to the present embodiment.

FIG. 11 is a schematic block diagram illustrating a configuration of the terminal apparatus 1 in the present embodiment. As illustrated, the terminal apparatus 1 is configured to include a radio transmission/reception unit 10 and a higher layer processing unit 14. The radio transmission/ reception unit 10 is configured to include an antenna unit 11, a radio frequency (RF) unit 12, and a baseband unit 13. The higher layer processing unit 14 is configured to include a medium access control layer processing unit 15 and a radio resource control layer processing unit 16. The radio transmission/reception unit 10 is also referred to as a transmitter, a receiver or a physical layer processing unit.

The higher layer processing unit 14 outputs uplink data (transport block) generated by a user operation or the like, to the radio transmission/reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the radio resource control layer. The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control layer processing unit 16 sets the various configuration information/parameters in accordance with the information indicating the various configuration information/parameters received from the base station apparatus 3.

The radio transmission/reception unit 10 performs processing of a physical layer, such as modulation, demodulation, coding, decoding, and the like. The radio transmission/reception unit 10 demultiplexes, demodulates, and decodes a signal received from the base station apparatus 3, and outputs the information resulting from the decoding to the higher layer processing unit 14. The radio transmission/reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in a frequency domain.

The baseband unit 13 generates an SC-FDMA symbol by performing Inverse Fast Fourier Transform (IFFT) of data, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 12:
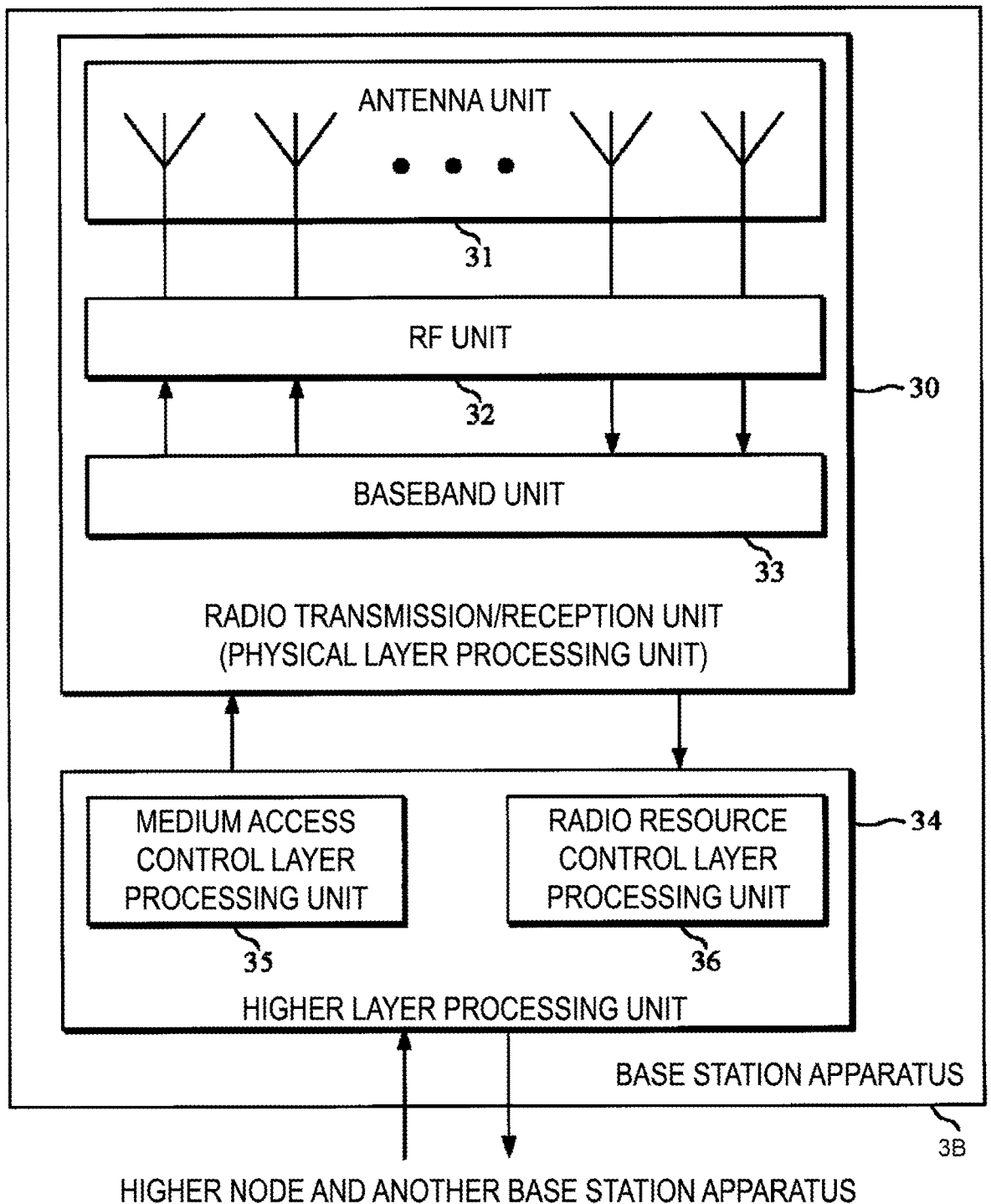
FIG. 12 is a schematic block diagram illustrating a configuration of a target base station apparatus 3B according to the present embodiment.

FIG. 12 is a schematic block diagram illustrating a configuration of the target base station apparatus 3B according to the present embodiment. As illustrated, the target base station apparatus 3B is configured to include a radio transmission/reception unit 30 and a higher layer processing unit 34. The radio transmission/reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission/reception unit 30 is also referred to as a transmitter, a receiver or a physical layer processing unit. A configuration of the source base station apparatus 3A may be the same as the configuration of the target base station apparatus 3B.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing for the medium access control layer. The medium access control layer processing unit 35 performs processing associated with a scheduling request, based on various types of configuration information/parameters managed by the radio resource control layer processing unit 36. The higher layer processing unit 34 may transmit information to another base station apparatus and an MME/GW3C. The higher layer processing unit 34 may receive information from another base station apparatus and the MME/GW3C.

The radio resource control layer processing unit 36 included in the higher layer processing unit 34 performs processing for the radio resource control layer. The radio resource control layer processing unit 36 generates, or acquires from a higher node, downlink data (transport block) allocated on a physical downlink shared channel, system information, an RRC message, a MAC Control Element (CE), and the like, and outputs them to the radio transmission/reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters.

The functionality of the radio transmission/reception unit 30 is similar to the functionality of the radio transmission/reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of the terminal apparatus 1 according to the present embodiment will be described below.

(A1) A first aspect of the present embodiment is a terminal apparatus that includes a receiver configured to receive an uplink grant, and a medium access control layer processing unit configured to perform processing of an HARQ entity, wherein in a case that a first uplink grant is indicated to an HARQ process, the first uplink grant corresponds to a C-RNTI, and a previous second uplink grant that the HARQ entity passes for the HARQ process is an uplink grant configured by MAC, the medium access layer processing unit considers that an NDI is toggled for the HARQ process regardless of a value of an NDI included in the first uplink grant, and in a case that the first uplink grant is indicated to the HARQ process, and the first uplink grant corresponds to the C-RNTI, and the previous second uplink grant that the HARQ entity passes for the HARQ process is an uplink grant configured by RRC, the medium access layer processing unit determines whether the NDI is toggled for the HARQ process or not, based on the value of the NDI included in the first uplink grant.

(A2) A second aspect of the present embodiment is a base station apparatus that includes a transmitter configured to transmit an uplink grant to a terminal apparatus, a receiver configured to receive a PUSCH from the terminal apparatus, and a medium access control layer processing unit configured to perform scheduling of a PUSCH, wherein the medium access layer processing unit assumes (1) and (2) below in a case of performing the scheduling of the PUSCH.

(1) In a case that a first uplink grant is indicated to an HARQ process, the first uplink grant corresponding to a C-RNTI, and a previous second uplink grant that the HARQ entity passes for the HARQ process is an uplink grant configured by MAC, the terminal apparatus considers that an NDI is toggled for the HARQ process regardless of a value of an NDI included in the first uplink grant.

(2) In a case that the first uplink grant is indicated to the HARQ process, the first uplink grant corresponds to a C-RNTI, and a previous second uplink grant that the HARQ entity passes for the HARQ process is an uplink grant configured by RRC, the terminal apparatus determines whether an NDI is toggled for the HARQ process or not, based on a value of an NDI included in the first uplink grant.

(A3) A third aspect of the present embodiment is a terminal apparatus that includes a medium access control layer processing unit configured to perform DRX for controlling a PDCCH monitoring activity, and a receiver configured to receive a handover command in a source cell, wherein in a case that the handover command (i) includes information related to transmission timing in a target cell, and (ii) does not include an uplink grant, active time for the DRX in the target cell includes at least a first period in which a first PDCCH indicating initial transmission has not been received at all in the target cell.

(A4) A fourth aspect of the present embodiment is a base station apparatus that includes a transmitter configured to transmit an uplink grant to a terminal apparatus, a receiver configured to receive a PUSCH from the terminal apparatus, and a medium access control layer processing unit configured to perform scheduling of a PUSCH, wherein the medium access layer processing unit assumes (1) below in a case of performing the scheduling of the PUSCH.

(1) In a case that the handover command (i) includes information related to transmission timing in a target cell, and (ii) does not include an uplink grant, active time for the DRX in the target cell includes at least a first period in which a first PDCCH indicating initial transmission in the target cell has not been received.

(5) In the third or fourth aspect of the present embodiment, the medium access control layer processing unit does not initiate a random access procedure in the first period.

(6) In the third or fourth aspect of the present embodiment, the initial transmission is an initial transmission in an uplink.

(7) In the third or fourth aspect of the present embodiment, the initial transmission includes an initial transmission in an uplink and an initial transmission in a downlink.

(8) In the third or fourth aspect of the present embodiment, the PDCCH is a PDCCH corresponding to a C-RNTI.

(9) In the third or fourth aspect of the present embodiment, the PDCCH includes a PDCCH corresponding to a C-RNTI, and a PDCCH corresponding to an SPS C-RNTI.

Consequently, the terminal apparatus and the base station apparatus can efficiently communicate with each other.

The base station apparatus 3 according to an aspect of the present invention can also be achieved as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

A program running on an apparatus according to an aspect of the present invention may serve as a program that controls a Central Processing Unit (CPU) and the like to cause a computer to operate in such a manner as to enable the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for enabling such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to enable some of the functions described above, and additionally may be configured to enable the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission/reception unit
11 Antenna unit
12 RF unit
13 Baseband unit
14 Higher layer processing unit
15 Medium access control layer processing unit
16 Radio resource control layer processing unit
30 Radio transmission/reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
reception circuitry configured or programmed to receive a handover command in a source cell, the handover command including first information related to transmission timing in a target cell;
transmission circuitry configured or programmed to
set the transmission timing for a Physical Uplink Shared Channel (PUSCH) in the target cell based on the first information after performing downlink synchronization with the target cell, and
transmit the PUSCH; and
Medium Access Control (MAC) layer processing circuitry configured or programmed to initiate a random access procedure on a primary cell in a case that at least one Scheduling Request (SR) is pending, no Uplink-Shared Channel (UL-SCH) resources are available for a transmission in a subframe, and a MAC entity has no valid Physical Uplink Control Channel (PUCCH) resource for the SR in any subframe, wherein
the MAC layer processing circuitry is configured or programmed to not initiate the random access procedure on the primary cell in a case that the at least one SR is pending, no UL-SCH resources are available for the transmission in the subframe, the MAC entity has no valid PUCCH resource for the SR in any subframe, and the first information is configured,
the reception circuitry is configured or programmed to consider that a handover from the source cell to the target cell is completed in a case of detecting a response to the PUSCH,
the response is detected based on at least a Physical Downlink Control Channel (PDCCH) with Cyclic Redundancy Check (CRC) parity bits scrambled by a Cell-Radio Network Temporary Identifier (C-RNTI), and
the first information, the PUSCH, and the response are not transmitted in the random access procedure.

2. A communication method used for a terminal apparatus, comprising:
receiving a handover command in a source cell, the handover command including first information related to transmission timing in a target cell;
setting the transmission timing for a Physical Uplink Shared Channel (PUSCH) in the target cell based on the first information after performing downlink synchronization with the target cell,
transmitting the PUSCH;
initiating a random access procedure on a primary cell in a case that at least one Scheduling Request (SR) is pending, no Uplink-Shared Channel (UL-SCH) resources are available for a transmission in a subframe, and a Medium Access Control (MAC) entity has no valid Physical Uplink Control Channel (PUCCH) resource for the SR in any subframe; and
not initiating the random access procedure on the primary cell in a case that the at least one SR is pending, no UL-SCH resources are available for the transmission in the subframe, the MAC entity has no valid PUCCH resource for the SR in any subframe, and the first information is configured, wherein a handover from the source cell to the target cell is considered completed in a case of detecting a response to the PUSCH, the response is detected based on at least a Physical Downlink Control Channel (PDCCH) with Cyclic Redundancy Check (CRC) parity bits scrambled by a Cell-Radio Network Temporary Identifier (C-RNTI), and the first information, the PUSCH, and the response are not transmitted in the random access procedure.

\* \* \* \* \*

UNITED STATES PATENT AND TRADEMARK OFFICE
CERTIFICATE OF CORRECTION

PATENT NO. : 10,966,127 B2
APPLICATION NO. : 16/461009
DATED : March 30, 2021
INVENTOR(S) : Shoichi Suzuki et al.

It is certified that error appears in the above-identified patent and that said Letters Patent is hereby corrected as shown below:

On the Title Page

In item (73), for the second Assignee, change "New Territories (JP)" to --New Territories (HK)--

Signed and Sealed this
Twenty-sixth Day of April, 2022

Katherine Kelly Vidal
*Director of the United States Patent and Trademark Office*